US012748370B2

(12) United States Patent
Hisadome et al.

(10) Patent No.: US 12,748,370 B2
(45) Date of Patent: Sep. 29, 2026

(54) FIXING ROTATING MEMBER, FIXING DEVICE, AND ELECTROPHOTOGRAPHIC IMAGE FORMING APPARATUS

(71) Applicant: CANON KABUSHIKI KAISHA, Tokyo (JP)

(72) Inventors: Kosei Hisadome, Kanagawa (JP); Akira Okano, Kanagawa (JP); Matsutaka Maeda, Kanagawa (JP); Mizuki Kawabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/187,622

(22) Filed: Apr. 23, 2025

(65) Prior Publication Data

US 2025/0334911 A1 Oct. 30, 2025

(30) Foreign Application Priority Data

Apr. 24, 2024 (JP) ................................. 2024-070502

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 4,272,179 | A | 6/1981 | Seanor | |
| 6,223,017 | B1 | 4/2001 | Akutsu | |
| 6,595,907 | B1 | 7/2003 | Ishikawa | |
| 10,802,433 | B1 | 10/2020 | Watanabe | |
| 2002/0175154 | A1 | 11/2002 | Karube | |
| 2004/0086307 | A1 | 5/2004 | Murai | |
| 2012/0148317 | A1 | 6/2012 | Samei | |
| 2016/0154352 | A1* | 6/2016 | Yokoyama | G03G 15/2039 399/329 |
| 2017/0160682 | A1 | 6/2017 | Nishizawa | |
| 2021/0373473 | A1 | 12/2021 | Lee | |
| 2022/0043381 | A1* | 2/2022 | Saito | G03G 15/2025 |
| 2025/0231511 | A1* | 7/2025 | Hisadome | G03G 15/206 |

FOREIGN PATENT DOCUMENTS

| | | | |
|---|---|---|---|
| CN | 1615049 | A | 5/2005 |
| CN | 109814352 | A | 5/2019 |
| EP | 4207946 | A1 | 7/2023 |

(Continued)

*Primary Examiner* — Sevan A Aydin
(74) *Attorney, Agent, or Firm* — Canon U.S.A., Inc. IP Division

(57) ABSTRACT

A fixing rotating member includes a base material containing a first resin, a heat generating layer containing silver on the base material, and a protective layer containing a second resin on a surface of the heat generating layer on a side opposite to a side facing the base material, in which the heat generating layer extends in a circumferential direction of an outer peripheral surface of the base material, the heat generating layer is a layer including a porous portion, and at least one of the base material and the protective layer contains particles having a function of preventing oxidation of the heat generating layer.

10 Claims, 4 Drawing Sheets

(56) References Cited

FOREIGN PATENT DOCUMENTS

| | | | | | |
|---|---|---|---|---|---|
| JP | 2005084077 | A | | 3/2005 | |
| JP | 2008143113 | A | | 6/2008 | |
| JP | 2008158352 | A | | 7/2008 | |
| JP | 2015206883 | A | | 11/2015 | |
| JP | 5834477 | B2 | | 12/2015 | |
| JP | 2017138358 | A | | 8/2017 | |
| JP | 2021051136 | A | | 4/2021 | |
| KR | 20070119266 | A | * | 12/2007 | ......... G03G 15/2053 |
| WO | WO-2017131041 | A1 | * | 8/2017 | ............. H05B 3/283 |

* cited by examiner

FIXING ROTATING MEMBER, FIXING DEVICE, AND ELECTROPHOTOGRAPHIC IMAGE FORMING APPARATUS

BACKGROUND OF THE INVENTION

Field of the Invention

The present disclosure relates to a fixing rotating member used in a fixing device of an electrophotographic image forming apparatus such as an electrophotographic copying machine or a printer, the fixing device, and the electrophotographic image forming apparatus.

Description of the Related Art

A fixing device mounted on an electrophotographic image forming apparatus such as an electrophotographic copying machine or a printer generally fixes a toner image to a recording material by heating the recording material carrying an unfixed toner image at a nip portion, which is formed by a heated fixing rotating member and a pressure roller in contact with the fixing rotating member while conveying the recording material.

A fixing device of an electromagnetic induction heating system has been developed and put into practical use, the fixing device having a heat generating layer on a fixing rotating member and being able to directly heat the heat generating layer. The fixing device of the electromagnetic induction heating system has an advantage that a warm-up time is short.

The heat generating layer requires conductivity and durability against repeated strain under heating. For example, Japanese Patent Application Publication No. 2021-051136 discloses a fixing member including a first metal layer as a heat generating layer containing Cu.

SUMMARY OF THE INVENTION

The inventors have an expectation of an effect of reducing uneven heat generation and have attempted to apply a silver nano-ink capable of controlling a fine line width and a space when forming a heat generating layer. The heat generating layer formed of a silver nano-ink is advantageous in bending resistance because it can be formed into a thin layer. In addition, the heat generating layer has approximately submicron pores. For this reason, pores exhibit damper effects even for stress in a compression direction due to pressurization and heating, and occurrence of buckling or the like can be curbed. As a result, the effect of improving durability can be expected.

On the other hand, in a fixing rotating member, there is a phenomenon that the temperature of a member increases at an end where paper does not pass, that is, a so-called paper non-passing portion. The fixing rotating member is heated to maintain a fixing temperature at any time in order to reliably fix toner at a paper passing portion through which paper passes. Since the paper passes through the paper passing portion while taking away heat, heating is continuously required. On the other hand, in the paper non-passing portion, there is no transfer of heat due to the passage of paper, and thus the temperature of the member may become higher than a set temperature. This phenomenon is likely to occur particularly under special use environments such as continuous printing on small-sized paper.

The inventors found that, when a fixing rotating member using a silver nano-ink for manufacturing a heat generating layer is used, the resistance of the heat generating layer increases when a high temperature state above a set temperature continues for a long period of time in a paper non-passing portion. When the resistance increases in the paper non-passing portion of such small-sized paper, the amount of heat generation due to electromagnetic induction becomes uneven, and when fixing to paper having a size larger than that of small-sized paper, the fixing properties at the end of the paper deteriorate.

The disclosure provides a fixing rotating member that is excellent in durability even in a printing environment where a high temperature state of the fixing rotating member continues for a long time. The disclosure also provides a fixing device including the fixing rotating member, and an electrophotographic image forming apparatus.

The present disclosure relates to a fixing rotating member comprising a base material comprising a first resin; a heat generating layer comprising silver on the base material; and a protective layer comprising a second resin on a surface of the heat generating layer on a side opposite to a side facing the base material, wherein the heat generating layer extends in a circumferential direction of an outer peripheral surface of the base material, the heat generating layer is a layer comprising a porous portion, and at least one of the base material and the protective layer comprises a particle having a function of preventing oxidation of the heat generating layer.

The present disclosure also relates to an electrophotographic image forming apparatus comprising an image carrier that carries a toner image; a transfer device that transfers the toner image to a recording material; and a fixing device that fixes the transferred toner image to the recording material, wherein the fixing device is the fixing device mentioned above.

According to the disclosure, there is provided a fixing rotating member that is excellent in durability even in a printing environment where a high temperature state continues for a long time. In addition, according to the disclosure, a fixing device including the fixing rotating member, and an electrophotographic image forming apparatus are provided.

Further features of the present invention will become apparent from the following description of exemplary embodiments with reference to the attached drawings.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. In the present disclosure, wording such as "at least one selected from the group consisting of XX, YY and ZZ" means any of: XX; YY; ZZ; a combination of XX and YY; a combination of XX and ZZ; a combination of YY and ZZ; or a combination of XX and YY and ZZ.

A fixing rotating member including a heat generating layer, a fixing device including the fixing rotating member, and an image forming device according to the disclosure will be described in detail with reference to the following specific configurations.

As described above, when the fixing rotating member using a silver nano-ink for manufacturing the heat generating layer is used, the resistance of the heat generating layer may increase when a high temperature state above a set temperature continues for a long time in a paper non-passing portion.

Figure 1:
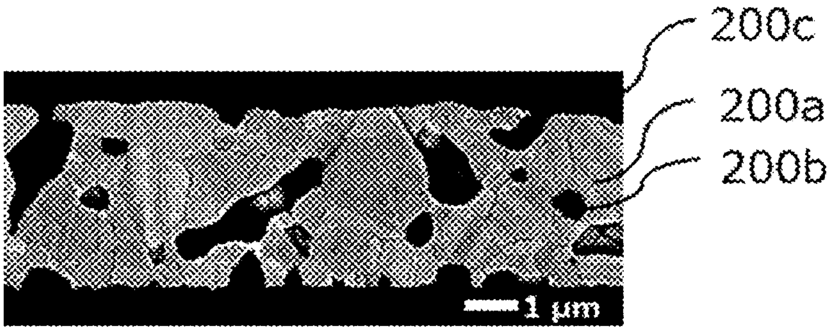
FIG. 1 is a cross-sectional view of a heat generating layer formed of a silver nano-ink according to an embodiment.

FIG. 1 shows a cross-sectional view of a heat generating layer formed using a silver nano-ink. 200*a* denotes crystals, 200*b* denotes pores, and 200*c* denotes a base material or a protective layer. Since the heat generating layer formed using a silver nano-ink has the pores 200*b*, it has a significantly large grain boundary area as compared with bulk silver. For this reason, it is considered that a region where silver reacts with oxygen in the air is also enlarged, making oxidation more likely to proceed than in bulk silver, resulting in an increase in resistance.

The inventors have found that when particles having a function of preventing oxidation of the heat generating layer are contained in at least one of a first resin-containing base material and a second resin-containing protective layer, an increase in resistance of the heat generating layer is thereby curbed even when a high temperature state continues for a long time.

The reason why an increase in resistance of the heat generating layer can be curbed by including particles having a function of preventing oxidation in at least one of the first resin-containing base material and the second resin-containing protective layer is considered as follows. At least one of the base material and the protective layer contains particles having a function of preventing oxidation of the heat generating layer, whereby oxygen is trapped in the particles having a function of preventing oxidation before oxygen in the air reaches the heat generating layer. Thereby, an amount of oxygen reaching the heat generating layer is reduced. As a result, it is considered that oxidation of the heat generating layer can be curbed even in a high-temperature state, and an increase in resistance can be curbed.

A fixing rotating member including a heat generating layer, a fixing device including the same, and an electrophotographic image forming apparatus will be described in detail below with reference to specific configurations.

However, the dimensions, materials and shapes of components described in this embodiment, relative arrangements thereof, and the like should be changed appropriately depending on the configurations of members to which the disclosure is applied and various conditions. That is, the scope of this disclosure is not intended to be limited to the following forms. In the following description, components having the same function are denoted by the same reference numerals in the drawings, and description thereof may be omitted.

Electrophotographic Image Forming Apparatus

An electrophotographic image forming apparatus (hereinafter simply referred to as "image forming apparatus") includes an image carrier carrying a toner image, a transfer device transferring the toner image to a recording material, and a fixing device fixing the transferred toner image to the recording material.

Figure 2:
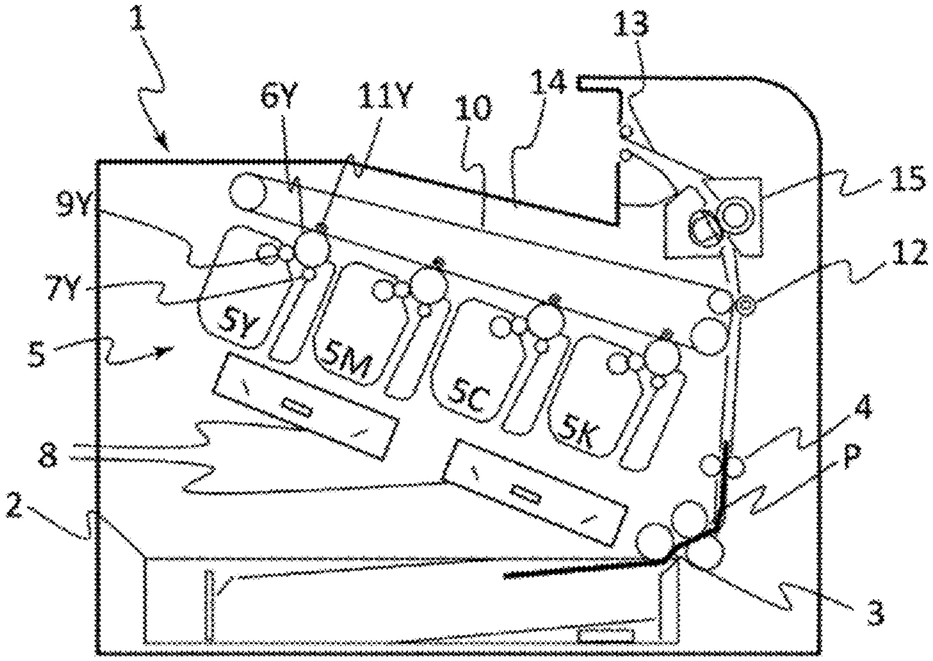
FIG. 2 is a schematic diagram of an electrophotographic image forming apparatus according to an embodiment.

FIG. 2 is a cross-sectional view showing the overall configuration of a color laser beam printer (hereinafter referred to as a printer) 1 as an example of an image forming apparatus equipped with a fixing device (image heating device) 15 according to an embodiment. A cassette 2 is accommodated in a lower portion of the printer 1 so as to be pulled out. A sheet P which is a recording material are loaded and accommodated in the cassette 2. The sheets P in the cassette 2 are fed to a registration roller 4 while being separated one by one by a separation roller 3.

As the sheet P which is a recording material, various sheets of different sizes and materials, for example, paper such as plain paper and thick paper, a plastic film, fabric, a sheet material subjected to a surface treatment such as coated paper, and a sheet material having a special shape such as an envelope or index paper can be used.

The printer 1 includes an image forming unit 5 as an image forming means in which image forming units 5Y, 5M, 5C, and 5K corresponding to respective colors of yellow, magenta, cyan and black are arranged side by side in a horizontal row. The image forming unit 5Y is provided with a photoreceptor drum 6Y which is an image carrier (electrophotographic photoreceptor) and a charging roller 7Y as a charging means for uniformly charging the surface of the photoreceptor drum 6Y.

Further, a scanner unit 8 is disposed below the image forming unit 5. The scanner unit 8 forms an electrostatic latent image on the photoreceptor drum 6Y by emitting a laser beam which is on/off modulated in response to a digital image signal input from an external apparatus such as a computer (not shown) on the basis of image information and generated by an image processing means. Further, the image forming unit 5Y is provided with a developing roller 9Y as a developing means for developing the electrostatic latent image on the photoreceptor drum 6Y as a toner image (toner image) by sticking toner to the electrostatic latent image, and a primary transfer unit 11Y for transferring the toner image on the photoreceptor drum 6Y to an intermediate transfer belt 10.

Toner images formed by the same process in the other image forming units 5M, 5C and 5K are multiply transferred to the toner image on the intermediate transfer belt 10 to which the toner image is transferred in the primary transfer unit 11Y. Thereby, a full-color toner image is formed on the intermediate transfer belt 10. The full-color toner image is transferred to the sheet P by a secondary transfer unit 12 as a transfer means. The primary transfer unit 11Y and the secondary transfer unit 12 are examples of fixing devices that fix a transferred toner image to a recording material.

Thereafter, the toner image transferred onto the sheet P (on the recording material) passes through the fixing device 15 and is fixed as a fixed image. Further, the sheet P passes through a discharge conveyance unit 13 and is discharged and loaded on a loading unit 14.

The image forming unit 5 is an example of an image forming means. Although the primary transfer unit 11Y and the secondary transfer unit 12 have been exemplified as fixing devices, the fixing device may be, for example, a direct transfer type fixing device that directly transfers a toner image from the image carrier to the sheet P. Further, the image forming device may use a monochromatic configuration using only one color of toner.

Fixing Device

Figure 3:
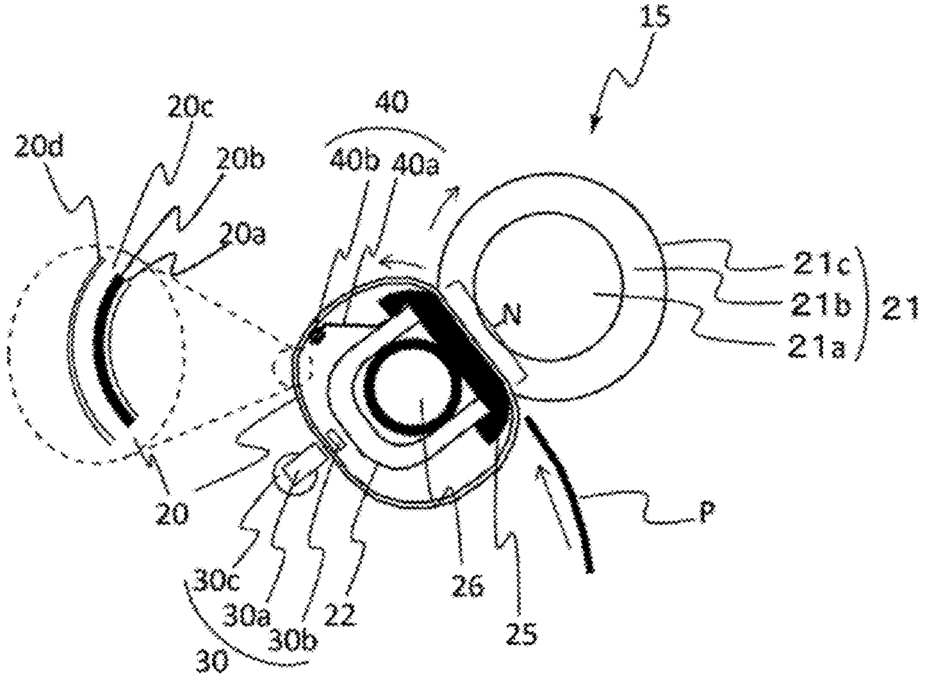
FIG. 3 is a schematic diagram showing a cross-sectional configuration of a fixing device according to an embodiment.
Figure 4:
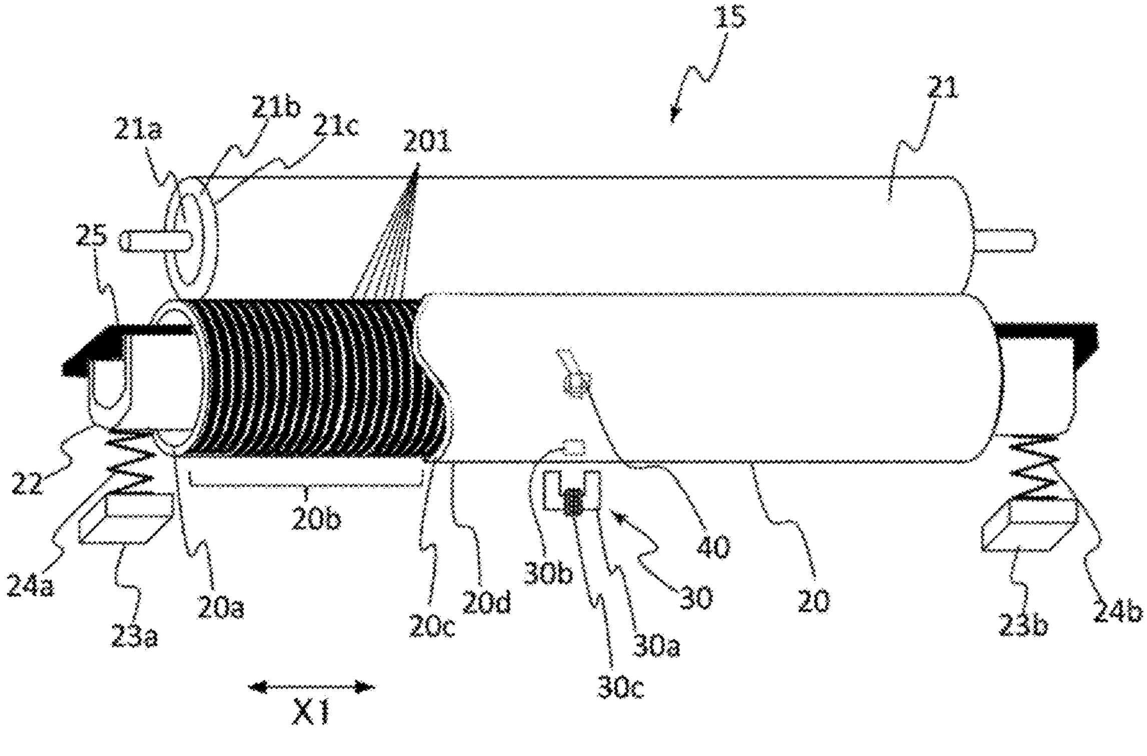
FIG. 4 is a schematic diagram showing a cross-sectional configuration of a fixing device according to an embodiment.

The fixing device 15 of this embodiment is an induction heating type fixing device (image heating device) that causes the fixing rotating member to generate heat by electromagnetic induction. That is, the fixing device includes a fixing rotating member and an induction heating device that causes the fixing rotating member to generate heat by induction heating. FIG. 3 shows a cross-sectional configuration of the fixing device 15, and FIG. 4 is a perspective view of the fixing device 15. The housing and the like of the fixing device 15 are not shown in FIGS. 3 and 4. In the following description, a longitudinal direction X1 of the members configuring the fixing device 15 is a direction orthogonal to the conveyance direction of the recording material and the thickness direction of the recording material, that is, the rotation axis direction of a fixing rotating member 20.

The fixing device 15 includes the fixing rotating member 20, a film guide 25, a pressure roller 21, a pressing stay 22, a magnetic core 26, an exciting coil, a thermistor 40, and a current sensor 30. The fixing device 15 fixes an image to the recording material by heating the recording material on which the image is formed. The fixing rotating member 20 is a fixing rotating member of this embodiment, and the pressure roller 21 is an opposing member of this embodiment. The exciting coil functions as a magnetic field generating means in this embodiment. Details of the fixing rotating member will be described later.

The fixing rotating member 20 includes a base material 20*a*, a heat generating layer 20*b* on the base material 20*a*, and a protective layer 20*e* containing a second resin on the surface of the heat generating layer opposite to a side facing the base material side.

The heat generating layer 20*b* may generate heat by, for example, an induced current. The heat generating layer 20*b* is formed in a ring shape by being electrically connected in the circumferential direction, and heat generating rings 201 (FIG. 4) electrically separated in the longitudinal direction X1 (the rotation axis direction of the fixing rotating member 20) can be formed as heat generating patterns arranged in the longitudinal direction.

That is, the heat generating layer 20*b* can be configured to be divided into a plurality of annular regions each of which is connected in the circumferential direction of the fixing rotating member 20 and which are not electrically connected to each other in the rotation axis direction of the fixing rotating member 20. It is preferable that the heat generating rings 201, which are components of a heat generating pattern, be formed with a uniform width in the longitudinal direction X1.

The pressure roller 21 as an opposing body (pressure member) facing the fixing rotating member 20 includes a core bar 21*a* and an elastic layer 21*b* concentrically and integrally molded around the core bar in a roller shape, and a release layer 21*c* is provided on a surface layer. It is preferable that the elastic layer 21*b* be formed of a material having high heat resistance, such as silicone rubber, fluorine rubber, or fluorosilicone rubber. Both ends of the core bar 21*a* in the longitudinal direction are rotatably held and disposed between chassis side sheet metals (not shown) of the device via a conductive bearing.

Further, as shown in FIG. 4, pressing springs 24*a*, 24*b* are provided in a compressed manner between both ends of the pressing stay 22 in the longitudinal direction and spring receiving members 23*a*, 23*b* on the device chassis side, respectively, to apply a pressing force to the pressing stay 22.

In the fixing device 15 of this embodiment, a pressing force of a total pressure of approximately 100 N to 300 N (approximately 10 kgf to approximately 30 kgf) is applied. Thereby, the lower surface of the film guide 25 formed of a heat-resistant resin, such as polyphenylene sulfide (PPS), and the upper surface of the pressure roller 21 are brought into pressure contact with each other across the fixing rotating member 20, which is a cylindrical rotating body, to form a fixing nip portion N having a predetermined width.

The film guide 25, together with the pressure roller 21, functions as a nip portion forming member that forms a nip portion that holds and conveys a recording material carrying a toner image through the fixing rotating member 20.

The pressure roller 21 is driven to rotate in the clockwise direction by a drive means (not shown), and applies a counterclockwise rotational force to the fixing rotating member 20 by a frictional force with the outer surface of the fixing rotating member 20. Thereby, the fixing rotating member 20 rotates while sliding on the film guide 25.

Figure 5:
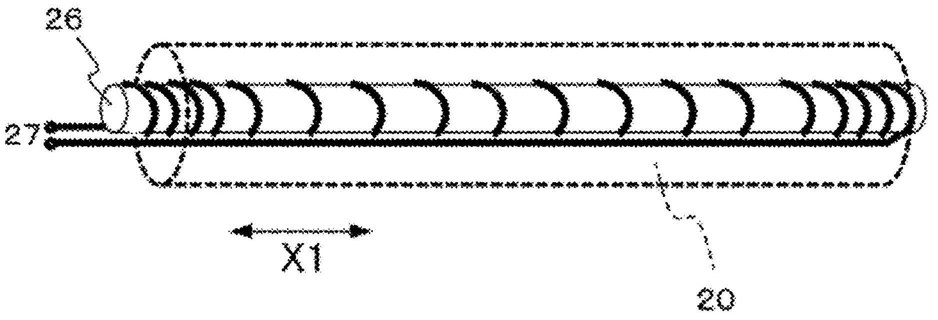
FIG. 5 is a schematic diagram of a magnetic core and an exciting coil of a fixing device according to an embodiment.

FIG. 5 is a schematic diagram of the magnetic core 26 and the exciting coil shown in FIG. 3, and the fixing rotating member 20 is shown by a dashed line in order to explain a positional relationship with the fixing rotating member 20. An induction heating device in an induction heating type fixing device that causes the fixing rotating member 20 to generate heat by electromagnetic induction may include the magnetic core 26 and the exciting coil 27.

The exciting coil 27 is disposed inside the fixing rotating member 20. The exciting coil 27 includes a spiral shape portion of which the spiral axis is substantially parallel to a direction along the rotation axis of the fixing rotating member 20, and forms an alternating magnetic field for making the heat generating layer 20*b* generate heat by electromagnetic induction. "Substantially parallel" means that two axes allow not only a completely parallel state but also a slight deviation to the extent that the heat generating layer can be heated by electromagnetic induction.

The magnetic core 26 is disposed in the spiral shape portion, extends in the rotation axis direction of the fixing rotating member 20, and does not form a loop outside the fixing rotating member 20. The magnetic core 26 induces lines of magnetic force of an alternating magnetic field.

In FIG. 5, the magnetic core 26 is inserted into a hollow portion of the fixing rotating member 20, which is a cylindrical rotating body. The exciting coil 27 is spirally wound around the outer periphery of the magnetic core 26 and extends in the longitudinal direction of the fixing rotating member 20. The magnetic core 26 has a cylindrical shape and is fixed by a fixing means (not shown) so as to be located substantially at the center of the fixing rotating member 20 in a cross-section viewed in the longitudinal direction (see FIG. 3).

The magnetic core 26 provided inside the exciting coil 27 has a role of guiding the lines of magnetic force (magnetic flux) of the alternating magnetic field generated by the exciting coil 27 to the inside of the heat generating layer 20*b* of the fixing rotating member 20 and forming a path (magnetic path) for the lines of magnetic force. The material of the magnetic core 26 is preferably a material having a small hysteresis loss and a high relative magnetic permeability, for example, at least one soft magnetic material having a high magnetic permeability selected from the group consisting of baked ferrite, ferrite resin, and the like.

The cross-sectional shape of the magnetic core 26 may be any shape that can be accommodated in the hollow portion of the fixing rotating member 20, and although it is not necessary to have a circular shape, it is preferable that the cross-sectional area can be enlarged as far as possible. The diameter of the magnetic core 26 is preferably 5 mm to 20 mm, more preferably 8 mm to 12 mm. In the fixing device used in an example of the disclosure, the diameter of the magnetic core 26 was 10 mm and the length in the longitudinal direction was 280 mm.

The exciting coil 27 is formed by spirally winding a copper wire (single conductor) having a diameter of 1 mm to 2 mm covered with heat-resistant polyamide imide around the magnetic core 26, preferably 5 to 40 turns, more preferably 10 to 30 turns. In the fixing device used in the example of the disclosure, the exciting coil 27 is formed by spirally winding the copper wire 20 turns. The exciting coil 27 is wound around the magnetic core 26 in a direction crossing the rotation axis direction of the fixing rotating member 20. For this reason, when a high-frequency alternating current is applied to the exciting coil 27, an alternating magnetic field is generated in a direction parallel to the rotation axis direction, and an induced current (circulating current) flows through each heat generating ring 201 of the heat generating layer 20*b* of the fixing rotating member 20 in accordance with the principle to be described below to generate heat.

As shown in FIGS. 3 and 4, the thermistor 40 as a temperature detecting means for detecting the temperature of the fixing rotating member 20 is configured with a spring plate 40*a* and a thermistor element 40*b*. The spring plate 40*a* is a support member having spring elasticity extending toward the inner surface of the fixing rotating member 20. The thermistor element 40*b* as a temperature detection element is installed at the tip of the spring plate 40*a*. The surface of the thermistor element 40*b* is covered with an insulator such as a polyimide tape to ensure electrical insulation. The thickness of the insulator is preferably from 10 μm to 100 μm, more preferably 25 μm to 75 μm. In the fixing device used in the example of the disclosure, a polyimide tape having a thickness of 50 μm was used.

The thermistor 40 is fixed to the film guide 25 at a position substantially in the center of the fixing rotating member 20 in the longitudinal direction. Then, the thermistor element 40*b* is pressed against the inner surface of the fixing rotating member 20 by the spring elasticity of the spring plate 40*a* and held in a contact state. The thermistor 40 may be disposed on the outer peripheral side of the fixing rotating member 20.

A current sensor 30 constituting a conduction monitoring device for monitoring the conduction in the circumferential direction of the heat generating layer 20*b* is arranged at the same position as the thermistor 40 in the longitudinal direction of the fixing device 15. That is, the current sensor 30 monitors the state of conduction of the heat generating ring 201 located at a position in contact with the thermistor element 40*b* among the plurality of heat generating rings 201 constituting the heat generating pattern of the fixing rotating member 20. The current sensor 30 is composed of an outer magnetic core 30*a*, an inner magnetic core 30*b*, and a detection coil 30*c*.

Heating Principle

Figure 6:
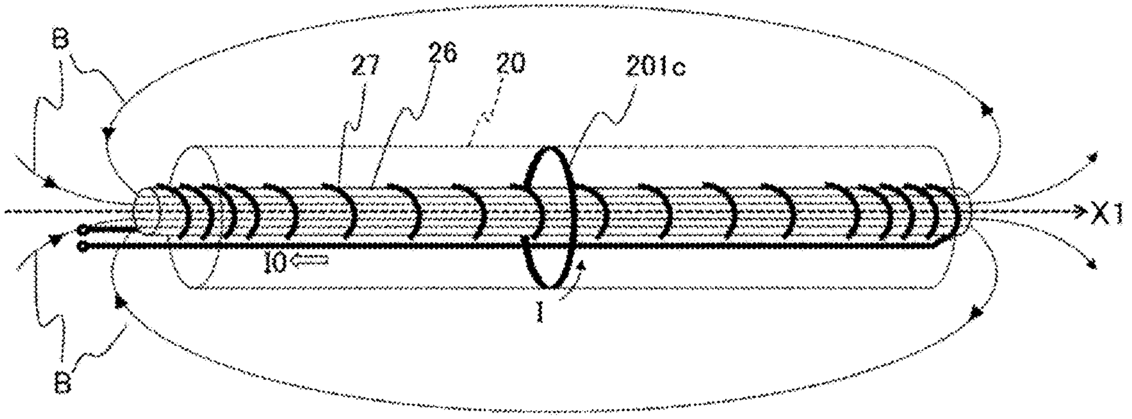
FIG. 6 is a diagram showing a magnetic field formed when a current is applied to an exciting coil according to an embodiment.

The heating principle of the fixing rotating member 20 in the induction heating type fixing device 15 will be described below. FIG. 6 is a concept diagram showing the moment the current is increasing in the direction of arrow 10 in the exciting coil 27. The exciting coil 27 is inserted into the fixing rotating member 20, forms an alternating magnetic field in the rotation axis direction of the fixing rotating member 20 by flowing an alternating current, and functions as a magnetic field generating means for generating an induced current I in the circumferential direction of the fixing rotating member 20.

Further, the magnetic core 26 functions as a member that induces a line of magnetic force B (dotted line in the figure) generated by the exciting coil 27 and forms a magnetic path. A general induction heating system is configured such that lines of magnetic force penetrate through the heat generating layer to generate an eddy current, whereas lines of magnetic force B loops on the outside of the fixing rotating member in this embodiment. That is, the heat generating layer 20*b* is mainly heated by an induced current induced by lines of magnetic force coming out of one longitudinal end of the magnetic core 26, passing through the outside of the heat generating layer 20*b*, and returning to the other longitudinal end of the magnetic core 26. Thus, even when the thickness of the heat generating layer is as thin as 5 μm or less, for example, heat can be efficiently generated.

When an alternating magnetic field is formed by the exciting coil 27, an induced current I according to the Faraday's law flows through each heat generating ring 201 of the heat generating layer 20*b* of the fixing rotating member 20. The Faraday's law is "when a magnetic field in a circuit is changed, an induced electromotive force for applying a current into the circuit is generated, and the induced electromotive force is proportional to a change over time in a magnetic flux vertically penetrating the circuit".

Regarding a heat generating ring 201*c* located at the center of the magnetic core 26 shown in FIG. 6 in the longitudinal direction, an induced current I flowing through the heat generating ring 201*c* when a high-frequency alternating current flows through the exciting coil 27 is considered. When a high-frequency alternating current flows, an alternating magnetic field is formed inside the magnetic core 26. The induced electromotive force acting on the heat generating ring 201*c* at that time is proportional to a change over time in the magnetic flux vertically penetrating the inside of the heat generating ring 201*c* in accordance with the following formula.

$$V = -N\frac{\Delta\Phi}{\Delta t}$$

V: Induced electromotive force

N: Number of turns of coil $\Delta\Phi/\Delta t$: Change in magnetic flux vertically penetrating circuit (heat generating ring 201*c*) at minute time $\Delta t$.

An induced current I, which is a circulating current circulating around the heat generating ring 201*c*, flows by the induced electromotive force V, and the heat generating ring 201*c* generates heat by the Joule heat generated with the induced current I. However, when the heat generating ring

201*c* is disconnected, the induced current I does not flow and the heat generating ring 201*c* does not generate heat.

(1) Outline of Configuration of Fixing Rotating Member

Details of the fixing rotating member of this embodiment will be described with reference to the drawings.

The fixing rotating member according to one aspect of the disclosure can be a rotatable member, for example, in the shape of an endless belt.

Figure 7:
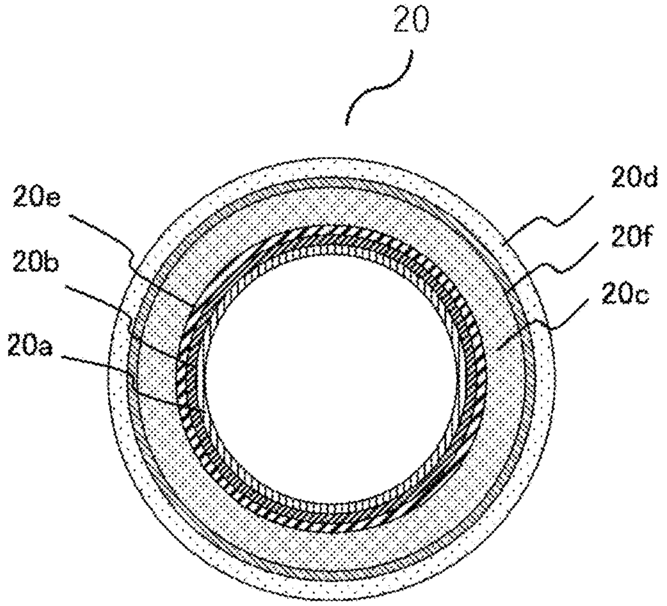
FIG. 7 is a cross-sectional configuration diagram of a fixing rotating member according to an embodiment.

FIG. 7 is a cross-sectional view of the fixing rotating member of this embodiment in the circumferential direction. The fixing rotating member includes the base material 20*a*, the heat generating layer 20*b* on the base material 20*a*, and the protective layer 20*e* on the surface of the heat generating layer 20*b* on a side opposite to the side facing the base material 20*a*. An elastic layer 20*c* or a surface layer (release layer) 20*d* may be provided on the protective layer 20*e* as necessary. In addition, an adhesive layer 20*f* may be provided between the elastic layer 20*c* and the surface layer 20*d*.

(2) Base Material

The material of the base material 20*a* is not particularly limited as long as it is a layer containing a first resin. That is, the base material 20*a* contains a first resin. When a belt is used for an electromagnetic induction type fixing device, it is preferable that the base material 20*a* be a layer which has little change in physical properties and maintains high strength in a state where the heat generating layer generates heat. For this reason, the base material 20*a* preferably contains a heat-resistant resin as a main component, and is preferably formed of a heat-resistant resin. The heat-resistant resin is a resin that does not dissolve or decompose at a temperature of, for example, less than 200° C. (preferably less than 250° C.).

The first resin contained in the base material 20*a* (preferably the resin constituting the base material) is preferably at least one selected from the group consisting of polyimide (PI), polyamide-imide (PAI), modified polyimide, and modified polyamide-imide. More preferably, the first resin is at least one selected from the group consisting of polyimide and polyamide-imide. Among these, polyimide is particularly preferable. In the disclosure, the main component means a component that is contained in the largest amount by mass among the components configuring the object (here, the base material).

Examples of the modification in the modified polyimide and the modified polyamide-imide include modified siloxane, modified carbonate, modified fluorine, modified urethane, modified triazine, modified phenol, and the like.

The content of the resin in the base material is not particularly limited, but preferably 90 to 100 mass %, and more preferably 95 to 100 mass %.

In the fixing rotating member, the material of the base material 20*a* can be analyzed by the following procedure.

A sample of 10 mm square and full thickness is cut out from the fixing rotating member, and when an elastic layer or a surface layer is included in the sample, the sample is removed with a razor, a solvent or the like. The material of the resulting sample is confirmed by performing total reflection (ATR) measurement using an Infrared Spectrometry (FT-IR) (for example, trade name: Frontier FT IR, PerkinElmer Inc.).

The material of the protective layer to be described later is also analyzed in the same manner as described above.

It is preferable that the base material 20*a* include particle having a function of preventing oxidation of the heat generating layer. The particle will be described later.

A filler may be incorporated in the base material 20*a* to improve thermal insulation and strength.

The shape of the base material can be appropriately selected in accordance with the shape of the fixing rotating member, and for example, various shapes such as an endless belt shape, a cylindrical hollow shape, and a film shape can be used.

In the case of a fixing belt, the thickness of the base material 20*a* is preferably, for example, 10 μm to 100 μm, more preferably, 20 μm to 60 μm. The thickness of the base material 20*a* is set to be in the above range, and thus both strength and flexibility can be achieved at high levels.

Further, on the surface (inner peripheral surface of the base material) of the base material 20*a* on a side opposite to a side facing the heat generating layer 20*b*, for example, a layer for preventing wear of the inner peripheral surface of the fixing rotating member when the inner peripheral surface of the fixing rotating member is in contact with another member or a layer for improving a sliding property with another member may be provided.

Another member such as a sliding member is disposed on the inner surface of the base material 20*a*, and a sliding load is large. For this reason, it is preferable that the base material be a solid layer from the viewpoint of making it possible to ensure durability as the base material. It is also preferable that the solid layer be located on the inner peripheral surface of the base material.

The solid layer is a layer that substantially includes no pores therein. "Substantially includes no pores" means that pores are not intentionally provided, but the presence of inevitably mixed pores such as scratches and cracks and chipping of materials is allowed. The presence or absence of pores can be observed by cross-sectional observation of the base material. The cross-sectional observation of the base material can be performed in the same manner as cross-sectional observation of the protective layer to be described below.

A solid layer can be provided in the base material 20*a* by using a cylindrical base material molded while substantially not including pores. For example, in the case of a thermosetting resin such as polyimide or polyamide-imide, when a solvent in a coating film is evaporated during molding, a sudden temperature rise may cause bumping and form pores. For this reason, it is preferable to set a treatment temperature and a treatment time so that the solvent does not perform bumping when evaporating the solvent in the coating film.

It is preferable that the solid layer contain a resin. As a resin that may be contained in the solid layer, a first resin that may be contained in the base material can be used.

The outer peripheral surface of the base material 20*a* is subjected to a surface roughening treatment such as blast, or a modification treatment such as ultraviolet rays, plasma, or chemical etching in order to improve adhesion and wettability with respect to the heat generating layer 20*b*.

A step of obtaining the base material is not particularly limited. For example, the base material can be obtained by applying a material for a base material containing a first resin onto the surface of a mold having a desired shape, such as a cylindrical shape, and heating it when necessary.

(3) Heat Generating Layer

The heat generating layer 20*b* is a layer that generates heat when electrified. In the principle of heat generation by induction heating using an exciting coil, when an alternating current is supplied to the exciting coil disposed in the vicinity of the fixing rotating member, a magnetic field is induced, a current is generated in the heat generating layer 20*b* of the fixing rotating member by the magnetic field, and heat is generated by the Joules heat. The heat generating layer extends in the circumferential direction of the outer peripheral surface of the base material.

The heat generating layer 20*b* contains silver. Silver has a low volume resistivity and is less likely to be oxidized. The content of silver with respect to the entire heat generating layer 20*b* is preferably 90.0 mass % or more, more preferably 99.0 mass % or more, and particularly preferably 99.9 mass % or more. The upper limit is not particularly limited, and examples thereof include 99.999 mass % or less, and 99.99 mass % or less. That is, the content of silver with respect to the entire heat generating layer may be 90.0 to 99.999 mass %, 99.0 to 99.999 mass %, and 99.9 to 99.99 mass %.

The volume resistivity of the heat generating layer 20*b* is not particularly limited, and preferably, $1.0\times10^{-8}$ to $8.0\times10^{-8}$ $\Omega\cdot$m, $2.0\times10^{-8}$ to $7.0\times10^{-8}$ $\Omega\cdot$m, and $2.0\times10^{-8}$ to $6.0\times10^{-8}$ $\Omega\cdot$m. Within the above range, the heat generating layer is more likely to generate heat. The volume resistivity of the heat generating layer can be adjusted by a baking temperature. The volume resistivity of the heat generating layer is measured by the following procedure:

First, a resin layer portion of the fixing rotating member is peeled off using a cutter. Then, measurement is performed by the following four-terminal resistance measurement method. For the measurement, a resistance meter 3541 manufactured by HIOKI E.E. Corporation, and two FPC-GS-500 probes manufactured by Form Factor, Inc. are used. The mode of the resistance meter is set to a low power mode, and a resistance value is measured by pressing the probes against the heat generating layer so that a distance between the respective sense probes is 20 mm. The measured resistance value is converted into a volume resistivity using the width and film thickness of the heat generating layer. The width and film thickness of the heat generating layer are measured by a scanning electron microscope.

It is preferable that the silver contained in the heat generating layer have a crystal structure. In addition, the number average crystal grain size of silver is preferably 500 nm or less, more preferably 250 nm or less, still more preferably 220 nm or less, particularly preferably 170 nm or less, and particularly more preferably 140 nm or less. When the number average crystal grain size is within the above range, the fixing rotating member 20 is pressurized and deformed at the nip portion N, and even when stress is repeatedly applied, a large number of stable crystal interfaces can be formed on the heat generating layer 20*b*. For this reason, the occurrence of a crack on the crystal interface is easily curbed.

The lower limit of the number average crystal particle size is not particularly limited, and may be in the rage of, for example, 10 nm to 500 nm, 10 nm to 250 nm, 10 nm to 220 nm, 10 nm to 170 nm, and 10 nm to 140 nm. The number average crystal grain size can be adjusted by adjusting the formation temperature of the heat generating layer. Specifically, when the formation temperature of the heat generating layer is increased, the value of the number average particle size becomes large, and when the formation temperature of the heat generating layer is decreased, the value of the number average particle size becomes small. A method of measuring the number average crystal grain size will be described later.

The heat generating layer is a layer including a porous portion. Specifically, the heat generating layer has pores. It is preferable that the heat generating layer have pores in cross-sectional observation in the circumferential direction. More specifically, there is at least one pore in the cross-section of the heat generating layer in the circumferential direction. Since the heat generating layer is a layer including a porous portion, pores exist in the porous portion, and a difference between a compressive elastic modulus in the compression direction of the heat generating layer 20*b* and a compressive elastic modulus of the resin configuring the base material or the resin layer can be reduced by a damper effect. When the difference in compressive elastic modulus between the resin configuring the base material or the resin layer and the heat generating layer is small, excessive stress can be prevented from being applied to an interface between the heat generating layer and the resin configuring the base material or the resin layer when local compressive deformation is applied to an end of paper, that is, a so-called paper edge. From the viewpoint of conductivity and durability, it is preferable to adjust the amount and size of the pores.

A method of providing pores in the heat generating layer 20*b* is not particularly limited. For example, after a pattern is formed on the heat generating layer 20*b* by a photolithography process, holes are formed by chemical etching or holes are formed by using a laser or a focused ion beam. In the disclosure, pore formation using a silver nano-particle material is particularly described. When using a silver nano-particle material, silver nanoparticles have a smaller number average crystal particle size than that of bulk silver, and thus a grain boundary area is likely to be larger than that of the bulk silver. For this reason, the occurrence of a crack on the crystal interface is easily curbed.

Figure 8A:
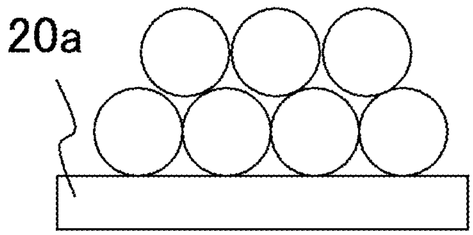
FIGS. 8A and 8B are schematic diagrams showing a film forming mechanism of a silver nano-ink forming a heat generating layer of a fixing rotating member according to an embodiment.
Figure 8B:
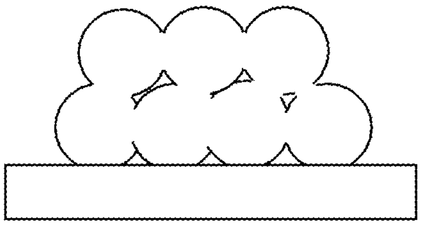

The heat generating layer is preferably a baked body (sintered body) of silver nanoparticles, and more preferably a baked body of a coating film of a silver nano-ink. When a coating material containing silver nanoparticles having a particle size of approximately 10 nm to 50 nm is formed, the particles are stacked as shown in FIG. 8A. The nanoparticles are fused to each other even by low-temperature baking of approximately 100° C. due to instability of their surface energy, and can be formed into a film with nano-sized pores as shown in FIG. 8B, resulting in a layer including a porous portion. The size and number of pores can be expressed as a porosity.

Specifically, the ratio of pores in the cross-section of the heat generating layer (hereinafter also referred to as a porosity), which is measured by observing the cross-section of the heat generating layer sampled from the fixing rotating member in the thickness direction, is preferably 15 to 50 area %, more preferably 15 to 45 area %, still more preferably 17 to 40 area %, particularly preferably 17 to 27 area %, and particularly more preferably 17 to 23 area %.

The porosity can be increased by increasing the temperature when the silver nano-ink is baked to obtain the heat generating layer. The porosity can also be reduced by lowering the temperature when the silver nano-ink is baked to obtain the heat generating layer.

A method of obtaining the heat generating layer is not particularly limited, but the heat generating layer can be obtained, for example, by coating the outer peripheral surface of the base material with a silver nano-ink and then baking (sintering). The temperature during the baking is not particularly limited, but is preferably 150° C. to 450° C., and more preferably 250° C. to 350° C. A baking time is also not particularly limited, and is, for example, 10 to 120 minutes.

Here, the number average crystal grain size and porosity of silver in the heat generating layer are determined as follows.

First, an evaluation sample is prepared. One sample having a length of 5 mm, a width of 5 mm and a thickness equal to the total thickness of the fixing rotating member is collected from the central portion of the fixing rotating member in the rotation axis direction. For the obtained sample, the cross-section of the fixing rotating member in the circumferential direction is polished by using an ion beam. At this time, a machining position is adjusted so that the cross-section of the heat generating layer in the circumferential direction is exposed by polishing using the ion beam.

An ion milling device (trade name: IM4000, manufactured by Hitachi High-Tech Corporation) is used to polish the cross-section using the ion beam. In the polishing of the cross-section using the ion beam, falling of a filler from the sample and mixing of an abrasive can be prevented, and the cross-section with less polishing marks can be formed.

Next, a beaker with a Nital liquid containing 3 wt % nitric acid in ethanol is prepared. Then, the entire sample subjected to cross-section processing using the ion beam is shaken for 12 seconds while being immersed in the Nital liquid. Thereafter, the sample is placed in a beaker with 100 wt % ethanol and subjected to ultrasonic cleaning for 60 seconds. For the ultrasonic cleaning, VS-100III manufactured by AS ONE CORPORATION is used. Bu performing this treatment, it becomes easy to emphasize boundaries between particles in subsequent SEM image acquisition.

Subsequently, a thin film having a thickness of 3 nm is formed on the cross-section of the sample after the ultrasonic treatment by using an osmium coater (trade name: Tennant20) to impart conductivity. Further, the cross-section of the heat generating layer is observed with a scanning electron microscope (SEM) (trade name: JSM-F100, manufactured by JEOL Ltd.) to obtain a cross-sectional image and an energy dispersive X-ray spectroscopy (EDS) image. The observation point is a position where the center of the heat generating layer in the thickness direction is the center of the SEM image in the vertical direction, and is in a range of 12.8 μm×9.6 μm in size. An observation condition is a 10,000-fold reflected electron image mode, and reflected electron image acquisition conditions are an acceleration voltage of 5.0 kV and a working distance of 10 mm.

Next, the obtained image is subjected to binarization processing by commercially available image software so that silver-containing metal crystal particle portions become white and portions other than the crystal particles become black.

Specifically, a reflected electron image is read by image analysis software ImageProPlus manufactured by MediaCybernetics Inc., and a luminance distribution of the image is obtained. Next, by setting the luminance range of the obtained luminance distribution, binarization for distinguishing between the silver-containing metal crystal particles and parts other than the crystal particles is performed. The Otsu's method is used as a method for the binarization.

Figure 9A:
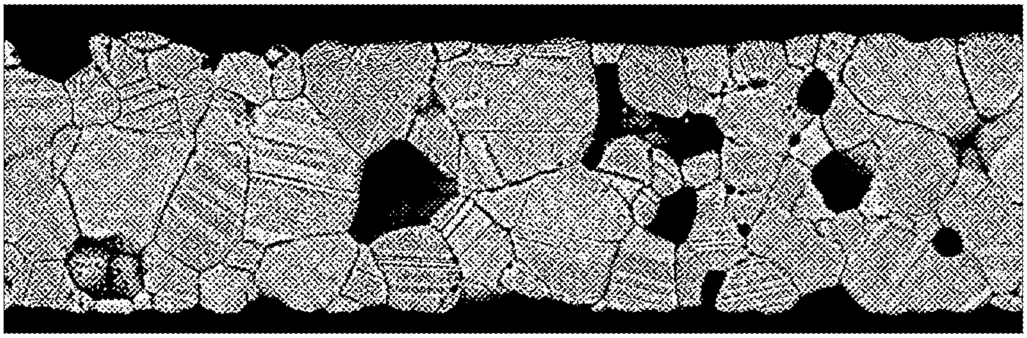
FIGS. 9A and 9B are a cross-sectional image and a binarized image of a heat generating layer of a fixing rotating member according to an embodiment.
Figure 9B:
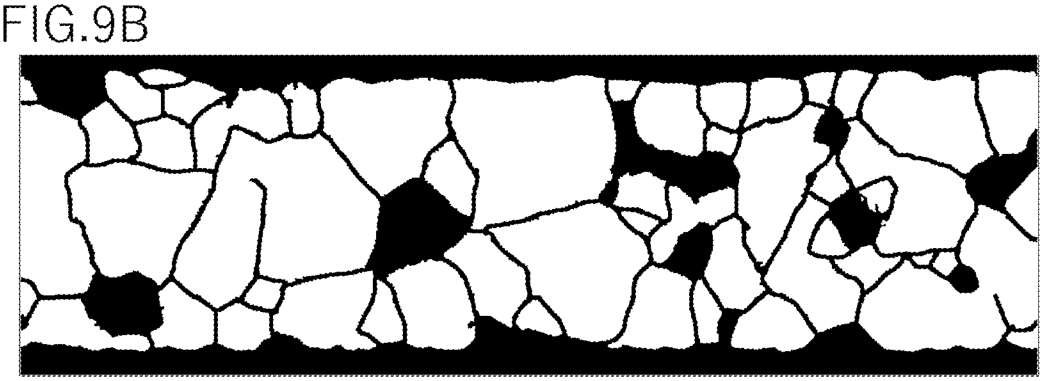

Then, a line dividing the crystal particles, which is obtained from a contrast difference due to a difference in brightness between the crystal particles or a difference in crystal orientation in FIG. 9A which is a cross-sectional image, is added to a binarized image to obtain a binarized image in which the crystal particles are divided (FIG. 9B).

A black-filled portion in FIG. 9B is pores included in the heat generating layer or a material of a layer other than the heat generating layer. Examples of the material other than the heat generating layer include, for example, the materials of the base material and the protective layer, and more specifically, polyimide and polyamide-imide. The examples also include particles that prevent oxidation of the heat generating layer.

It can be confirmed from the EDS image that the black-filled portion is a material of a layer other than the heat generating layer on the basis of the proportion of the elements in the black-filled portion. For example, it can be determined that a portion containing element C of 5 element % or more in the black-filled portion is a resin such as polyimide or polyamide-imide. For example, it can be determined that a portion containing Fe element of 5 element % or more is a particle that prevent oxidation of the heat generating layer. A portion of the black-filled portion except for the materials of the layers other than the heat generating layer is determined to be a pore.

A method of calculating the number average crystal grain size from the binarized image of the cross-section of the heat generating layer obtained in this manner will be described. Since a digital image processing technique is applied to these images, it is assumed that all the images have a general digital image format in which pixels are arranged in a grid pattern. In addition, the binarized image is a gray scale image only including luminance information, and then, images obtained by performing image processing on these images are all gray scale images of the same format unless otherwise noted.

First, an equivalent circle diameter of each crystal particle of silver is calculated. The equivalent circle diameter of each crystal particle means the diameter of a circle having the same area as the area of the crystal particle. Specifically, the number of pixels configuring each crystal particle is calculated, and the actual area of the crystal particle is calculated by multiplying the number of pixels by the area of one pixel.

In the SEM image used in the disclosure, the length of one side of one pixel is equivalent to 0.01 μm, and thus the number of pixels configuring each crystal particle is multiplied by 0.01×0.01 $\mu m^2$. Further, the equivalent circle diameter is calculated by obtaining the diameter of a circle having this area.

The total sum of the equivalent circle diameters of the crystal particles obtained in this manner is divided by the total number of crystal particles to calculate a number average crystal grain size.

The above operations are repeatedly performed for six samples collected from the fixing rotating member to calculate an average crystal grain size of each sample. Further, an arithmetic mean value of these six average crystal grain sizes is calculated to calculate a number average crystal grain size of silver crystals in the heat generating layer.

Here, the six samples are collected as follows. That is, as described above, one sample is collected from the central portion of the fixing rotating member in the rotation axis direction. When the length of the fixing rotating member in the rotation axis direction is L, one sample is collected from a portion separated from the central portion by 0.1 L in the rotation axis direction. From each sampling point, a total of six samples are collected similarly at portions 120° and 240° away in the circumferential direction of the fixing rotating member.

Further, a method of calculating a porosity from the binarized image of the cross-section of the heat generating layer obtained by the above-described procedure will be described.

At the position of the heat generating layer in the binarized image acquired by the above procedure, an image of 2.0 μm×2.0 μm is cut out. Four images are cut out from one SEM image. The position where the image is cut out is set as a position where the center of the heat generating layer in the thickness direction is the center position of the cut-out image in the vertical direction. In addition, the four images are cut out such that intervals of the four images are the same in a direction orthogonal to the thickness direction of the heat generating layer. Specifically, the images are cut out such that an interval between adjacent images is 0.96 μm. The above operations are performed for six SEM images to obtain cross-sectional images of 24 locations.

Particles of a silver-containing metal crystal are expressed as white regions, and an area occupied by the crystal particles in an image is calculated. Specifically, the number of pixels configuring each crystal particle is calculated, and the sum of the number of pixels is calculated. By multiplying the sum of the number of pixels by 0.01×0.01 $\mu m^2$ which is the area of one pixel, an area occupied by the crystal particles can be calculated.

Further, as described above, the black-filled region is a material of a layer other than pores and the heat generating layer. Consequently, an area occupied by the materials of the layers other than the heat generating layer in the black-filled region is calculated. Specifically, the number of pixels configuring each of the materials of the layers other than the heat generating layer is calculated, and the total sum of the number of pixels is calculated. By multiplying the sum of the number of pixels by 0.01×0.01 $\mu m^2$ which is the area of one pixel, an area occupied by the materials of the layers other than the heat generating layer can be calculated.

Since a porosity indicates the ratio of a space that is not occupied by the crystal particles or the materials of the layers other than the heat generating layer, the porosity is obtained as follows using the area occupied by the crystal particles and the area occupied by the materials other than the heat generating layer, which are obtained above.

Porosity (%)={2.0×2.0 ($\mu m^2$)−area occupied by crystal particles ($\mu m^2$)−area occupied by materials of layers other than heat generating layer ($\mu m^2$)}/{2.0×2.0 ($\mu m^2$)}×100

The porosity is calculated for 24 locations in the range of 2.0 μm×2.0 μm in size of the cross-sectional image of the heat generating layer, and an average porosity obtained by the arithmetic mean is set as the porosity of the heat generating layer.

The thickness of the heat generating layer 20*b* is preferably 5 μm or less. This is because the fixing rotating member can have an appropriate flexibility and a small heat capacity by setting the thickness to 5 μm or less. Further, by setting the thickness to 5 μm or less, bending resistance performance of the fixing rotating member is further improved. As shown in FIG. 3, the fixing rotating member 20 is driven to rotate while being pressed by the film guide 25 and the pressure roller 21. With each rotation, the fixing rotating member 20 is pressurized and deformed at the nip portion N and receives stress.

It is preferable that the heat generating layer 20*b* of the fixing rotating member 20 be designed not to cause fatigue fracture even when the repeated bending continues to be applied to the fixing rotating member until the durable life of the fixing device. When the thickness of the heat generating layer 20*b* is reduced, the resistance to fatigue fracture of the heat generating layer 20*b* is significantly improved. This is because, when the heat generating layer 20*b* is pressed and deformed along the shape of the curved surface of the film guide 25, an internal stress acting on the heat generating layer 20*b* becomes smaller as the heat generating layer 20*b* becomes thinner.

For the above reasons, the thickness of the heat generating layer 20*b* is preferably 5 μm or less from the viewpoint of further improving the resistance to a decrease in heat capacity and fatigue failure. The thickness of the heat generating layer 20*b* is, for example, 1 μm to 5 μm, 2 μm to 5 μm, and 2 μm to 4 μm.

The heat generating layer 20*b* extends in the circumferential direction of the outer peripheral surface of the base material 20*a*. The heat generating layer 20*b* may generate heat when electrified and may be configured in a predetermined pattern. Particularly, as shown in FIG. 4, it is preferable that a plurality of heat generating layers 20*b* formed in a ring shape in the circumferential direction of the fixing rotating member be formed in an electrically divided state in the rotation axis direction. With such a configuration, a local temperature rise can be curbed when a crack occurs in the heat generating layer 20*b*. It is preferable that the ring shape has a substantially fixed width in the axial direction of the rotating body.

On the other hand, with such a pattern configuration, the surface area of the heat generating layer 20*b* is increased and deterioration due to oxidation is likely to occur. In the fixing rotating member of the disclosure, at least one of the base material and the protective layer contains particles having a function of preventing oxidation of the heat generating layer, and thus deterioration due to oxidation can be prevented even in such a case.

The width of the ring of the heat generating layer 20*b* is preferably 100 μm or more from the viewpoint of manufacturability and pyrogenicity, more preferably 200 μm or more, and still more preferably 300 μm or more. From the viewpoint of uneven heat generation, the width of the ring is preferably 1000 μm or less, more preferably 900 μm or less, and still more preferably 700 μm or less. The width of the ring is, for example, 100 μm to 1000 μm, 200 μm to 900 μm, and 300 μm to 700 μm.

An interval between the rings of the heat generating layer 20*b* is preferably 50 μm or more from the viewpoint of manufacturability and pyrogenicity, and more preferably 100 μm or more. From the viewpoint of uneven heat generation, the interval is preferably 400 μm or less, and more preferably 300 μm or less. The interval between rings is, for example, 50 μm to 400 μm and 100 μm to 300 μm.

(4) Resin Layer

In the disclosure, a portion including the protective layer 20*e*, the elastic layer 20*c*, the adhesive layer 20*f*, and the surface layer 20*d* may be expressed as a resin layer. The fixing rotating member necessarily includes the protective layer in the resin layer, but may or may not include other resin layers. For example, the fixing rotating member may include the protective layer and one surface layer in the resin layer.

(5) Protective Layer

The fixing rotating member includes a protective layer on the surface of the heat generating layer on a side opposite to the side facing the base material. The protective layer 20*e* protects the heat generating layer 20*b*, and has a function of ensuring insulation of the heat generating layer 20*b* and improving strength.

Other materials are not particularly limited as long as the protective layer 20*e* contains a second resin. When a belt is used for an electromagnetic induction type fixing device, it is preferable that the protective layer 20*e* be a layer that maintains high strength with little change in physical properties in a state where the heat generating layer 20*b* generates heat, similar to the base material 20*a*.

For this reason, the protective layer 20*e* preferably contains a heat-resistant resin, more preferably contains a heat-resistant resin as a main component, and still more preferably is formed of a heat-resistant resin. The heat-resistant resin is a resin that does not dissolve or decompose at a temperature of, for example, less than 200° C. (preferably less than 250° C.).

The second resin contained in the protective layer 20*e* preferably contains at least one selected from the group consisting of polyimide (PI), polyamide-imide (PAI), modified polyimide, and modified polyamide-imide. More preferably, the second resin contains at least one selected from the group consisting of polyimide and polyamide-imide. Modification is similar to that described for the base material 20*a*.

Among these, polyimide is particularly preferable. The main component means a component that is contained in the largest amount among the components configuring the object (here, the protective layer).

The content of the second resin in the protective layer is not particularly limited, but preferably 90 to 100 mass %, and more preferably 95 to 100 mass %.

Methods of forming the base material 20*a* and the protective layer 20*e* are not particularly limited. For example, an imide-based material can be formed into a film in a liquid form of varnish by applying and baking it using a known method.

The conditions of the baking are not particularly limited. For example, a baking temperature may be 200° C. to 400° C., and is preferably 200° C. to 300° C. and more preferably 200° C. to 250° C. A baking time may be 15 to 60 minutes, and is preferably 15 to 30 minutes.

The protective layer 20*e* may contain a filler to improve heat transfer properties and strength, and preferably contains particles having a function of preventing oxidation of the heat generating layer to improve durability as described above.

The protective layer containing the particles having a function of preventing oxidation of the heat generating layer in this manner can be formed, for example, by dispersing the particles having a function of preventing oxidation of the heat generating layer in advance in the varnish to be coated.

As a coating method, dipping, spraying, flow coating, ring coating, or contact coating with a sponge or the like can be used. In the disclosure, a coating method using ring coating or the like is described.

The following method is a specific example of a method in which the protective layer containing particles having a function of preventing oxidation of the heat generating layer is formed on the heat generating layer 20*b*. The entire surface of the heat generating layer 20*b* was ring-coated with a PAI solution (VYROMAX HR-16NN, manufactured by TOYOBO CO., LTD.) containing particles having a function of preventing oxidation of the heat generating layer. The protective layer 20*e* containing particles having a function of preventing oxidation can be formed by performing baking at 250° C. for 60 minutes.

Particles having a function of preventing oxidation of the heat generating layer are not particularly limited, and examples of the particles include particles capable of capable of capturing oxygen. That is, it is preferable that the particles capture oxygen to exhibit a function of preventing oxidation of the heat generating layer. An aspect of capture of oxygen is not particularly limited, but for example, oxygen may be captured by the particles themselves being oxidized by oxygen, or oxygen may be captured by the particles adsorbing oxygen.

Among these, it is preferable that the particles exhibit a function of preventing oxidation of the heat generating layer by oxidation of the particles themselves. The oxidation may be a single-stage reaction or a multi-stage reaction of two or more stages. That is, after the particles themselves have been oxidized, they may be further oxidized to exhibit a function of preventing oxidation of the heat generating layer.

The particles having a function of preventing oxidation of the heat generating layer preferably contain at least one element selected from the group consisting of Group 3 to Group 16 elements on the International Union of Pure and Applied Chemistry (IUPAC) periodic table, and more preferably contain at least one element selected from the group consisting of Group 4 elements such as Ti, Zr, Hf and Rf elements, Group 8 elements such as Fe, Ru, Os and Hs elements, Group 10 elements such as Ni, Pd, Pt and Ds elements, Group 11 elements such as Cu, Ag, Au and Rg elements, and Group 12 elements such as Zn, Cd, Hg and Cn elements.

An aspect in which the particles contain the element is not particularly limited, but examples thereof include a simple substance of the element and an oxide containing the element.

The particles having a function of preventing oxidation of the heat generating layer preferably contain at least one element selected from the group consisting of Ni, Ti, Fe, Cu, and Zn elements, and more preferably contain an Fe element. Among these, it is further preferable to contain at least one selected from the group consisting of Fe, FeO and $Fe_3O_4$ as a simple substance.

The number average particle size of the particles having a function of preventing oxidation of the heat generating layer is preferably from 0.01 μm to 50 μm, and more preferably from 0.1 μm to 30 μm from the viewpoint of handling and dispersibility. From the viewpoint of persistence of preventing the oxidation of the heat generating layer and the easy avoidance of damage of the protective layer due to local stress during use, the number average particle size is further preferably from 0.2 μm to 10 μm.

In addition, the shape of the particle having a function of preventing oxidation of the heat generating layer is not particularly limited, but examples thereof include a spherical shape, a pulverized shape, a needle shape, a plate shape, and a whiskers shape.

The content of the particles in the layer containing the particles having a function of preventing oxidation of the heat generating layer is not particularly limited. For example, when the protective layer contains the particles, the ratio of the particles to the total content of the second resin and the particles in the protective layer is preferably 0.1 to 20.0 area %, and more preferably 0.5 to 15.0 area %. From the viewpoint of avoiding the damage of the protective layer due to local stresses during handling and use, the ratio is further preferably 0.8 to 10.0 area %. The ratio of particles can be adjusted by changing the content ratio of the second resin and the particles in the material forming the protective layer.

Even when the base material contains the particles, the ratio of the particles to the total content of the first resin and the particles in the base material can be set to be in the above range for the same reason as described above.

Material evaluation, number average particle size evaluation, and ratio calculation of the particles having a function of preventing oxidation of the heat generating layer are performed using samples in the above-described evaluation of the porosity.

The material evaluation of the particles having a function of preventing oxidation is performed as follows.

In a portion corresponding to the protective layer, a reflected electron image of the SEM is acquired such that an acquisition visual field range is 12.8 μm×9.6 μm. Reflected electron image acquisition conditions are an acceleration voltage of 5.0 kV and a working distance of 10 mm. In addition, an energy dispersive X-ray spectroscopy (EDS) spectrum is acquired under the condition that the acceleration voltage is changed to 10.0 kV. When the protective layer contains particles having a function of preventing oxidation of the heat generating layer, it is possible to obtain an SEM image in which the particles having a function of preventing oxidation of the heat generating layer appear as an island floating in the sea due to a difference in reflectance between electrons. Electron beams are caused to be incident on particle parts corresponding to the island and having a function of preventing oxidation of the heat generating layer, and the material is determined from the proportion of elements displayed on the software of the SEM.

The number average particle size evaluation of the particles having a function of preventing oxidation of the heat generating layer was performed as follows.

In the portion corresponding to the protective layer, a reflected electron image of the SEM is acquired such that the acquisition visual field range is 12.8 μm×9.6 μm. The reflected electron image acquisition conditions are an acceleration voltage of 5.0 kV and a working distance of 4 mm.

Next, the obtained image is subjected to ternarizing processing by commercially available image software so that a portion corresponding to the second resin of the protective layer becomes gray, the particles having a function of preventing oxidation of the heat generating layer become white, and the other portions become black. Specifically, a reflected electron image is read by image analysis software ImageProPlus manufactured by MediaCybernetics Inc., and a luminance distribution of the image is obtained. Next, by setting the luminance range of the obtained luminance distribution, it is possible to perform ternarizing processing for distinguishing between the portion corresponding to the second resin of the protective layer, the particles having a function of preventing oxidation of the heat generating layer, and the other portions.

A method of calculating the number average particle size of the particles having a function of preventing oxidation of the heat generating layer from the ternary image of the cross-section of the heat generating layer obtained in this manner will be described. Since a digital image processing technique is applied to these images, it is assumed that all the images have a general digital image format in which pixels are arranged in a grid pattern. In addition, the ternary image is a gray scale image only including luminance information, and then, images obtained by performing image processing on these images are all gray scale images of the same format unless otherwise noted.

First, an equivalent circle diameter of each of the particles having a function of preventing oxidation of the heat generating layer is calculated. The equivalent circle diameter of each particle means the diameter of a circle having the same area as the area of the particle. Specifically, the number of pixels configuring each crystal particle is calculated, and the actual area of the crystal particle is calculated by multiplying the number of pixels by the area of one pixel.

In the SEM image used in the disclosure, the length of one side of one pixel is equivalent to 0.01 μm, and thus the number of pixels configuring particles having a function of preventing oxidation is multiplied by 0.01×0.01 $\mu m^2$. Further, the equivalent circle diameter is calculated by obtaining the diameter of a circle having this area.

The total sum of the equivalent circle diameters of the particles obtained in this manner is divided by the total number of particles to calculate a number average particle size.

The above operations are repeatedly performed for six samples collected from the fixing rotating member to calculate the number average particle size of each sample. Further, an arithmetic mean value of these six number average particle sizes is calculated to calculate the number average particle size of particles having a function of preventing oxidation of the heat generating layer. The six samples are collected in the same manner as the calculation of the number average crystal grain size of the silver crystals.

In the layer containing the particles having a function of preventing oxidation of the heat generating layer, a ratio of the particles to the total content of the resin and the particles is calculated as follows.

In the ternary image acquired to obtain the number average particle size of the particles having a function of preventing oxidation, an image with a size of 2.0 μm×2.0 μm is cut out. Four images are cut out from one SEM image. The position where the image is cut out is set as a position where the center of the heat generating layer in the thickness direction is the center position of the cut-out image in the vertical direction. In addition, the four images are cut out such that intervals of the four images are the same in a direction orthogonal to the thickness direction of the heat generating layer. Specifically, the images are cut out such that an interval between adjacent images is 0.96 μm. The above operations are performed for six SEM images to obtain cross-sectional images of 24 locations.

A portion of the protective layer which corresponds to the second resin is displayed as a gray area, and an area occupied in these images is calculated. Specifically, the number of pixels configuring the resin is calculated, and the sum of the number of pixels is calculated. By multiplying the sum of the number of pixels by 0.01×0.01 $\mu m^2$ which is the area of one pixel, an area occupied by the portion of the protective layer which corresponds to the second resin can be calculated.

Similarly, particles having a function of preventing oxidation are displayed as white regions, and an area occupied by particles in these images is calculated. Specifically, the number of pixels configuring each particle is calculated, and the sum of the number of pixels is calculated. By multiplying the sum of the number of pixels by 0.01×0.01 $\mu m^2$ which is the area of one pixel, an area occupied by the particles having a function of preventing oxidation of the heat generating layer can be calculated.

The ratio of the particles having a function of preventing oxidation of the heat generating layer is obtained as follows by using the area occupied by the portion corresponding to the resin and the area occupied by the particles which are obtained above.

Ratio of particles={area occupied by particles having function of preventing oxidation of heat generating layer ($\mu m^2$)}/{area occupied by particles having function of preventing oxidation of heat generating layer ($\mu m^2$)+area occupied by portion corresponding to resin ($\mu m^2$)}×100

The ratio of the particles having a function of preventing oxidation of the heat generating layer is calculated for 24 locations in the range of 2.0 μm×2.0 μm in size of the cross-sectional image of the protective layer, and an average value obtained by the arithmetic average is set as the ratio of the particles having a function of preventing oxidation of the heat generating layer.

Although the above-described measurement method has been described with respect to a case where the protective layer contains particles having a function of preventing oxidation of the heat generating layer, measurement is performed similarly for a case where the base material contains particles having a function of preventing oxidation of the heat generating layer.

The thickness of the protective layer 20$e$ is preferably 10 μm to 100 μm, and more preferably 20 μm to 60 μm. From the viewpoint of bending resistance of the heat generating layer 20$b$, it is preferable that the thickness of the protective layer 20$e$ be adjusted such that the heat generating layer 20$b$ is positioned on the neutral axis. The neutral axis can be calculated from the thickness and elastic modulus of the base material 20$a$, and the thickness and elastic modulus of the protective layer 20$e$. Since the heat generating layer 20$b$ is positioned on the neutral axis, when the heat generating layer 20$b$ is repeatedly bent, stress applied to the heat generating layer 20$b$ is not biased, and thus it is possible to curb the occurrence of a crack in the heat generating layer 20$b$.

(6) Elastic Layer

The fixing rotating member may include the elastic layer 20$c$ on the outer peripheral surface of the protective layer 20$e$. The elastic layer 20$c$ is a layer for imparting flexibility to the fixing rotating member in order to secure a fixing nip in the fixing device. When the fixing rotating member is used as a heating member in contact with toner on paper, the elastic layer 20$c$ also functions as a layer for imparting flexibility making the surface of the heating member may follow the unevenness of the paper.

The elastic layer 20$c$ contains, for example, rubber as a matrix and particles dispersed in the rubber. More specifically, it is preferable that the elastic layer 20$c$ contains rubber and a thermally conductive filler, and it is preferable that the elastic layer 20$c$ is formed of a cured material obtained by curing a composition containing at least raw materials of the rubber (a base polymer, a crosslinking agent, and the like) and a thermally conductive filler.

The thickness of the elastic layer may be, for example, 100 μm to 1000 μm and 200 μm to 500 μm.

From the viewpoint of exhibiting the function of the elastic layer 20$c$ described above, it is preferable that the elastic layer 20$c$ be formed of a silicone rubber cured material containing thermally conductive particles, and it is more preferable that the elastic layer 20$c$ be formed of a cured material of an addition curing silicone rubber composition.

The silicone rubber compositions may include thermally conductive particles, base polymers, cross-linking agents and catalysts, as well as additives when necessary. Since the silicone rubber composition is mostly liquid, the thermally conductive filler is easily dispersed, and the elasticity of the elastic layer 20$c$ to be manufactured is easily adjusted by adjusting the degree of crosslinking in accordance with the type and addition amount of the thermally conductive filler.

The matrix functions to exhibit elasticity in the elastic layer 20$c$. It is preferable that the matrix contain silicone rubber from the viewpoint of exhibiting the function of the elastic layer 20$c$. The silicone rubber is preferably since it has high heat resistance capable of maintaining flexibility even under a high temperature of approximately 240° C. in the paper non-passing portion. As the silicone rubber, for example, a cured material of an addition curing liquid silicone rubber composition to be described later can be used. The elastic layer 20$c$ can be formed by applying and heating the liquid silicone rubber composition by a known method.

The liquid silicone rubber composition typically contains the following components (a) to (d).

Component (a): organopolysiloxane having an unsaturated aliphatic group

Component (b): organopolysiloxane having active hydrogen bonded to silicon

Component (c): catalysts

Component (d): thermally conductive filler

Each component will be described below.

Component (a)

The organopolysiloxane having an unsaturated aliphatic group is organopolysiloxane having an unsaturated aliphatic group, such as a vinyl group, and includes, for example, those shown in Formulas (1) and (2) below.

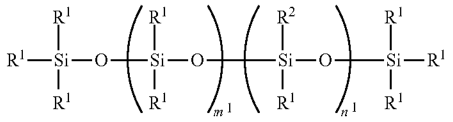

(1)

In Formula (1), $m^1$ represents an integer of 0 or more (preferably 500 to 1100), and $n^1$ represents an integer of 3 or more (preferably 10 to 40). Further, in Formula (1), $R^1$ each independently represents a monovalent unsubstituted or substituted hydrocarbon group that does not contain an unsaturated aliphatic group, where at least one of $R^1$ represents a methyl group, and $R^2$ each independently represents an unsaturated aliphatic group.

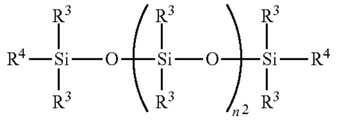

(2)

In Formula (2), $n^2$ represents a positive integer (preferably 500 to 1100), and $R^3$ each independently represents a monovalent unsubstituted or substituted hydrocarbon group that does not contain an unsaturated aliphatic group, where at least one of $R^3$ represents a methyl group, and $R^4$ is each independently represents an unsaturated aliphatic group.

Examples of the monovalent unsubstituted or substituted hydrocarbon group that does not contain an unsaturated aliphatic group and which can be represented by $R^1$ and $R^3$ in Formulas (1) and (2) may include the following groups.

Unsubstituted Hydrocarbon Group

Alkyl group (for example, methyl group, ethyl group, propyl group, butyl group, pentyl group, hexyl group)

Aryl group (for example, phenyl group)

Substituted Hydrocarbon Group

Substituted alkyl group (for example, chloromethyl group, 3-chloropropyl group, 3,3,3-trifluoropropyl group, 3-cyanopropyl group, 3-methoxypropyl group)

The organopolysiloxane represented by Formulas (1) and (2) has at least one methyl group directly bonded to a silicon atom forming a chain structure. Because of the ease of synthesis and handling, it is preferable that 50% or more of each of $R^1$ and $R^3$ be methyl groups, and it is more preferable that all of $R^1$ and $R^3$ be methyl groups.

In addition, examples of the unsaturated aliphatic group that can be represented by $R^2$ and $R^4$ in Formulas (1) and (2) may include the following groups: That is, examples of the unsaturated aliphatic group may include a vinyl group, an allyl group, a 3-butenyl group, a 4-pentenyl group, a 5-hexenyl group, and the like. Among these groups, both $R^2$ and $R^4$ are preferably a vinyl group because they are easily synthesized and handled, have a low cost, and a crosslinking reaction is easily performed.

From the viewpoint of moldability, the viscosity of the component (a) is preferably from 1000 $mm^2/s$ to 50000 $mm^2/s$, and more preferably from 3000 $mm^2/s$ to 20000 $mm^2/s$. When the viscosity is 1000 $mm^2/s$ or more, a hardness required for the elastic layer 20$c$ is easily adjusted, and when the hardness is 50000 $mm^2/s$ or less, the viscosity of the composition is not too high, and coating is facilitated. The viscosity (kinetic viscosity) can be measured using a capillary viscometer, a rotational viscometer, or the like on the basis of JIS Z 8803:2011.

The compounding amount of the component (a) is preferably 55 vol % or more from the viewpoint of durability and 65 vol % or less from the viewpoint of heat transfer, on the basis of the liquid silicone rubber composition used for forming the elastic layer 20$c$.

Component (b)

Organopolysiloxane having active hydrogen bonded to silicon reacts with the unsaturated aliphatic group of the component (a) by the function of a catalyst, and functions as a crosslinking agent for forming a cured silicone rubber.

As the component (b), any organopolysiloxane having a Si—H bond can be used. In particular, from the viewpoint of reactivity with an unsaturated aliphatic group of the component (a), those having an average of three or more hydrogen atoms bonded to silicon atoms in one molecule are suitably used.

Specific examples of the component (b) include linear organopolysiloxane represented by the following Formula (3) and cyclic organopolysiloxane represented by the following Formula (4).

(3)

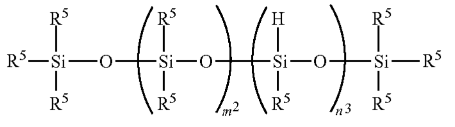

In Formula (3), $m^2$ represents an integer of 0 or more (preferably 10 to 30), $n^3$ represents an integer of 3 or more (preferably 5 to 20), and $R^5$ each independently represents a monovalent unsubstituted or substituted hydrocarbon group that does not contain an unsaturated aliphatic group.

(4)

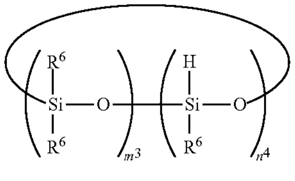

In Formula (4), $m^3$ represents an integer of 0 or more (preferably 10 to 30), $n^4$ represents an integer of 3 or more (preferably 5 to 20), and $R^6$ each independently represents a monovalent unsubstituted or substituted hydrocarbon group that does not contain an unsaturated aliphatic group.

Examples of the monovalent unsubstituted or substituted hydrocarbon group that does not contain an unsaturated aliphatic group and which can be represented by $R^5$ and $R^6$ in Formulas (3) and (4) include groups similar to $R^1$ in the above-described Structural Formula (1). Among these, it is preferable that 50% or more of $R^5$ and $R^6$ be methyl groups, and it is more preferable that all of $R^5$ and $R^6$ be methyl groups, because synthesis and handling are easy and excellent heat resistance can be easily obtained.

The content of the component (b) is preferably 0.1 to 5.0 parts by mass and more preferably 0.2 to 3.0 parts by mass, on the basis of 100 parts by mass of the component (a).

Component (c)

The catalyst used to form silicone rubber may be, for example, a hydrosilylation catalyst for promoting curing reactions. Known materials such as platinum compounds and rhodium compounds can be used as the hydrosilylation catalyst. The compounding amount of the catalyst can be set appropriately and is not particularly limited.

Component (d)

Examples of the thermally conductive filler include metals, metal compounds, and carbon fibers. A highly thermally conductive filler is further preferable, and specific examples thereof include the following materials.

Silicon metal (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor grown carbon fiber, PAN (polyacrylonitrile) carbon fiber, pitch-based carbon fiber.

These fillers can be used alone or in a mixed form of two or more types.

An average particle size of the filler is preferably from 1 μm to 50 μm from the viewpoint of handling and dispersibility, and more preferably from 3 μm to 30 μm. The average particle size mentioned here refers to a volume average particle size.

Further, as the shape of the filler, a spherical shape, a pulverized shape, a needle shape, a plate shape, and a whiskers shape are used. In particular, from the viewpoint of dispersibility, a filler having a spherical shape is preferable. Further, at least one type selected from the group consisting of a reinforcing filler, a heat-resistant filler, and a coloring filler may be added.

The content of the filler in the elastic layer is preferably 20% to 80% by volume and more preferably 30% to 60% by volume on the basis of the elastic layer, from the viewpoint of hardness and thermal conductivity of the elastic layer.

(7) Adhesive Layer

The fixing rotating member may include the adhesive layer 20$f$ for bonding the surface layer 20$d$ to be described later on the outer peripheral surface of the elastic layer 20$c$. The adhesive layer 20$f$ is a layer for bonding the elastic layer 20$c$ and the surface layer 20$d$ together. The adhesive used for the adhesive layer 20$f$ can be selected and used appropriately from known ones and is not particularly limited. However, from the viewpoint of ease of handling, it is preferable to use an addition curing silicone rubber containing a self-adhesive component.

The adhesive can contain, for example, a self-adhesive component, organopolysiloxane having a plurality of unsaturated aliphatic groups represented by vinyl groups in the molecular chain, hydrogenorganopolysiloxane, and a platinum compound as a crosslinking catalyst. The adhesive applied to the surface of the elastic layer 20*c* can be cured by an addition reaction to form the adhesive layer 20*f* for bonding the surface layer 20*d* to the elastic layer 20*c*.

The self-adhesive component may be, for example, the following components.

- Silane having at least one type, preferably two or more types, of functional groups selected from the group consisting of an alkenyl group such as a vinyl group, a (meth)acryloxy group, a hydrosilyl group (SiH group), an epoxy group, an alkoxysilyl group, a carbonyl group, and a phenyl group
- An organosilicon compound such as a cyclic or linear siloxane having from 2 silicon atoms to 30 silicon atoms, and preferably from 4 silicon atoms to 20 silicon atoms
- Non-silicon-based organic compounds (that is, not containing silicon atoms in the molecule), which may contain oxygen atoms in the molecule. However, from one to four, preferably from one to two aromatic rings such as from a monovalent to tetravalent, preferably from a divalent to tetravalent, are contained in one molecule. At least one, preferably two or more and four or less, functional groups (for example, alkenyl groups, (meth)acryloxy groups) that can contribute to a hydrosilylation addition reaction are contained in one molecule.

The above-mentioned self-adhesive component may be used alone or in combination of two or more types. In addition, filler components may be added to the adhesive within the scope of the disclosure from the viewpoint of adjusting viscosity and ensuring heat resistance. Examples of the filler component include the following.

- Silica, alumina, iron oxide, cerium oxide, cerium hydroxide, carbon black, and the like The compounding amount of each component contained in the adhesive is not particularly limited, and may be set appropriately. Such addition curing silicone rubber adhesives are also commercially available and readily available.

The thickness of the adhesive layer 20*f* is preferably 20 μm or less. By setting the thickness of the adhesive layer 20*f* to 20 μm or less, when the fixing belt according to this embodiment is used as a heating belt in a thermal fixing device, thermal resistance can be easily set to be small, and heat from the inner surface side can be efficiently transferred to a recording medium. The thickness of the adhesive layer 20*f* may be, for example, 1 μm to 20 μm and 2 μm to 10 μm.

(8) Surface Layer

The fixing rotating member may include the surface layer 20*d*. It is preferable that the surface layer 20*d* contain a fluorine resin in order to exhibit a function as a release layer for preventing the adhesion of toner to the outer peripheral surface of the fixing rotating member. For the formation of the surface layer 20*d*, for example, a resin molded in a tube shape and exemplified below may be used, or the surface layer 20*d* may be formed by coating a resin dispersion.

- Tetrafluoroethylene-perfluoro (alkylvinyl ether) copolymers (PFA), polytetrafluoroethylene (PTFE), tetrafluoroethylene-hexafluoropropylene copolymers (FEP), and the like Among the resin materials exemplified above, PFA is particularly suitably used from the viewpoint of moldability and toner releasability.

The thickness of the surface layer 20*d* is preferably from 10 μm to 50 μm. By setting the thickness of the surface layer 20*d* within this range, appropriate surface hardness of the fixing rotating member can be easily maintained.

EXAMPLES

In the following, the present disclosure will be specifically explained by using Examples. Note that the invention is not limited to the following Examples.

Example 1

The surface of a cylindrical stainless steel mold with an outer diameter of 30 mm was subjected to a mold release treatment and a commercially available polyimide precursor solution (U-Vanish S, manufactured by UBE Corporation) was applied by an immersion method to form a coating film. Next, this coating film was dried at 140° C. for 30 minutes to volatilize the solvent in the coating film, and then baked at 200° C. for 30 minutes and 400° C. for 30 minutes to imidize the coating film, forming a polyimide-coated based material with a film thickness of 40 μm and a length of 300 mm.

Next, a ring-shaped pattern with a width of 600 μm and intervals of 200 μm was formed on the polyimide film using a dispenser device with an ink containing silver nanoparticles (DNS351S, manufactured by Daicel Corporation). Then, it was baked at 300° C. for 30 minutes to form the heat generating layer 20*b* with a film thickness of 2.5 μm.

Next, the entire surface of the heat generating layer 20*b* was ring-coated with a solution prepared by dispersing 0.84 vol % $Fe_3O_4$ (KN-320, Toda Kogyo Corporation) in PAI (polyamide-imide, trade name: VYROMAX HR-16NN, manufactured by Toyobo Co., Ltd.) relative to a solid content of the PAI solution. Then, it was baked at 250° C. for 60 minutes to form the protective layer 20*e* having a thickness of 50 μm.

Next, a primer (trade name: DY39-051A/B, manufactured by Dow Toray Co., Ltd.) was applied substantially uniformly to the outer peripheral surface of the protective layer 20*e* so that a dry weight is 40 mg, the solvent was dried, and then a baking treatment was performed for 30 minutes in an electric furnace set at 160° C.

A silicone rubber composition layer having a thickness of 250 μm was formed on this primer by a ring coating method, and primary crosslinking was performed at 160° C. for 1 minute, and secondary crosslinking was performed at 200° C. for 30 minutes to form the elastic layer 20*c*.

The following silicone rubber composition was used.

As the organopolysiloxane having an alkenyl group of the component (a), vinylated polydimethylsiloxane having at least two vinyl groups in one molecule (trade name: DMS-V41, manufactured by Gelest Inc., a number average molecular weight of 68,000 (based on polystyrene), 0.04 mmol/g molar equivalent of a vinyl group) was prepared.

In addition, as the organopolysiloxane containing an Si—H group of the component (b), methylhydrogenpolysiloxane having at least two Si—H groups in one molecule (trade name: HMS-301, manufactured by Gelest Inc., a number average molecular weight 1,300 (based on polystyrene), 3.60 mmol/g molar equivalent of a Si—H group) was prepared. 0.5 parts by mass of the component (b) was added to 100 parts by mass of the component (a) and sufficiently mixed to obtain an addition curing silicone rubber stock solution.

Furthermore, a catalytic amount of an addition curing reaction catalyst (platinum catalyst: platinum carbonylcyclovinylmethylsiloxane complex) and an inhibitor were added as the component (c) and mixed sufficiently.

High-purity spherical alumina (trade name: Alnabeads CB-A10S; manufactured by Showa Titanium Co., Ltd.) was mixed as a heat-conductive filler of the component (d) with the addition curing silicone rubber stock solution at a volume ratio of 45% based on the elastic layer, and kneaded. An addition curing silicone rubber composition was then obtained with a JIS K 6253A durometer hardness of 10° after curing.

Next, an addition curing silicone rubber adhesive (trade name: SE1819CV A/B, manufactured by Dow Toray Co., Ltd.) for forming the adhesive layer 20*f* was substantially uniformly applied onto the obtained elastic layer 20*c* to a thickness of approximately 20 μm. A fluororesin tube (trade name: NSE, manufactured by Gunze Limited) with an inner diameter of 29 mm and a thickness of 30 μm for forming the surface layer 20*d* was stacked while expanding its diameter.

Thereafter, by uniformly pressing a belt surface from above the fluororesin tube, an excess adhesive was pressed out from between the elastic layer 20*c* and the fluororesin tube so that the thickness of the adhesive layer 20*f* became thin to approximately 5 μm. Next, the adhesive was cured by heating at 200° C. for 30 minutes, the fluororesin tube was fixed onto the adhesive layer 20*f*, and finally, both ends thereof were cut to a length of 240 mm to obtain a fixing rotating member.

The heat generating layer in the obtained fixing rotating member includes a porous portion, and a number average crystal grain size of silver in the heat generating layer was 180 nm and a porosity was 40 area %. A number average particle size of particles contained in a protective layer and having a function of preventing oxidation of the heat generating layer was 0.27 μm. A volume resistivity of the heat generating layer was $2.8\times10^{-8}$ Ω·m.

Example 2

A fixing rotating member was manufactured in the same manner as in Example 1, except that a heat generating layer was formed at 250° C. for 30 minutes.

The heat generating layer in the obtained fixing rotating member includes a porous portion, and a number average crystal grain size of silver in the heat generating layer was 160 nm and a porosity was 25 area %. A number average particle size of particles contained in a protective layer and having a function of preventing oxidation of the heat generating layer was 0.27 μm. A volume resistivity of the heat generating layer was $4.7\times10^{-8}$ Ω·m.

Example 3

A fixing rotating member was manufactured in the same manner as in Example 1, except that a heat generating layer was formed at 200° C. for 30 minutes.

The heat generating layer in the obtained fixing rotating member includes a porous portion, and a number average crystal grain size of silver in the heat generating layer was 120 nm and a porosity was 17 area %. A number average particle size of particles contained in a protective layer and having a function of preventing oxidation of the heat generating layer was 0.27 μm. A volume resistivity of the heat generating layer was $5.7\times10^{-8}$ Ω·m.

Example 4

The entire surface of the heat generating layer 20*b* was ring-coated with a solution prepared by dispersing 0.84 vol % FeO in PAI (VYROMAX HR-16NN, manufactured by Toyobo Co., Ltd.) relative to a solid content of the PAI solution. The FeO used was FEO16PB manufactured by Kojundo Chemical Lab. Co., Ltd., which was ground using a mortar and classified. Apart from that, a fixing rotating member was manufactured in the same manner as in Example 1.

The heat generating layer in the obtained fixing rotating member includes a porous portion, and a number average crystal grain size of silver in the heat generating layer was 180 nm and a porosity was 40 area %. A number average particle size of particles contained in a protective layer and having a function of preventing oxidation of the heat generating layer was 1.0 μm. A volume resistivity of the heat generating layer was $2.8\times10^{-8}$ Ω·m.

Example 5

The entire surface of the heat generating layer 20*b* was ring-coated with a solution prepared by dispersing 0.52 vol % Fe in PAI (VYROMAX HR-16NN, manufactured by Toyobo Co., Ltd.) relative to a solid content of the PAI solution. The Fe used was FEE14PB manufactured by Kojundo Chemical Lab. Co., Ltd., which was ground using a mortar and classified. Apart from that, a fixing rotating member was manufactured in the same manner as in Example 1.

The heat generating layer in the obtained fixing rotating member includes a porous portion, and an average crystal grain size of silver in the heat generating layer was 180 nm and a porosity was 40 area %. A number average particle size of particles contained in a protective layer and having a function of preventing oxidation of the heat generating layer was 1.0 μm. A volume resistivity of the heat generating layer was $2.8\times10^{-8}$ Ω·m.

Example 6

The entire surface of the heat generating layer 20*b* was ring-coated with a solution prepared by dispersing 0.84 vol % $Fe_3O_4$ (KN-320, Toda Kogyo Corporation) in PI (polyimide, trade name: U-Varnish S, manufactured by UBE Corporation) relative to a solid content of the PI solution. Next, this coating film was dried at 140° C. for 30 minutes to volatilize the solvent in the coating film, and then baked at 200° C. for 30 minutes and 400° C. for 30 minutes to imidize the coating film, forming the protective layer 20*e* having a film thickness of 40 μm. Apart from that, a fixing rotating member was manufactured in the same manner as in Example 1.

The heat generating layer in the obtained fixing rotating member includes a porous portion, and a number average crystal grain size of silver in the heat generating layer was 200 nm and a porosity was 45 area %. A number average particle size of particles contained in a protective layer and having a function of preventing oxidation of the heat generating layer was 0.27 μm. A volume resistivity of the heat generating layer was $2.8\times10^{-8}$ Ω·m.

Example 7

A coating film was formed by performing a mold release treatment on the surface of a cylindrical stainless steel mold with an outer diameter of 30 mm and applying a solution prepared by dispersing 0.80 vol % $Fe_3O_4$ (KN-320, Toda Kogyo Corporation) in a commercially available polyimide precursor solution (U-Vanish S, manufactured by UBE Corporation) relative to a solid content of the PI solution by an immersion method. Next, this coating film was dried at 140° C. for 30 minutes to volatilize the solvent in the coating film, and then baked at 200° C. for 30 minutes and 400° C. for 30 minutes to imidize the coating film, forming a base material of a polyimide film having a film thickness of 40 μm and a length of 300 mm. Apart from that, a fixing rotating member was manufactured in the same manner as in Example 1.

The heat generating layer in the obtained fixing rotating member includes a porous portion, and a number average crystal grain size of silver in the heat generating layer was 180 nm and a porosity was 40 area %. A number average particle size of particles contained in a protective layer and having a function of preventing oxidation of the heat generating layer was 0.27 μm. A volume resistivity of the heat generating layer was $2.8\times10^{-8}$ Ω·m.

Example 8

A coating film was formed by performing a mold release treatment on the surface of a cylindrical stainless steel mold with an outer diameter of 30 mm and applying a solution prepared by dispersing 9.89 vol % of CB (EC-300J, Lion Corporation) in a commercially available polyimide precursor solution (U-Vanish S, manufactured by UBE Corporation) relative to a solid content of the PAI solution by an immersion method. Next, this coating film was dried at 140° C. for 30 minutes to volatilize the solvent in the coating film, and then baked at 200° C. for 30 minutes and 400° C. for 30 minutes to imidize the coating film, forming a base material of a polyimide film having a film thickness of 40 μm and a length of 300 mm. Apart from that, a fixing rotating member was manufactured in the same manner as in Example 1.

The heat generating layer in the obtained fixing rotating member includes a porous portion, and a number average crystal grain size of silver in the heat generating layer was 180 nm and a porosity was 40 area %. A number average particle size of particles contained in a protective layer and having a function of preventing oxidation of the heat generating layer was 0.27 μm. A volume resistivity of the heat generating layer was $2.8\times10^{-8}$ Ω·m.

Example 9

A fixing rotating member was created in the same manner as in Example 1 except that the entire surface of the heat generating layer 20*b* was ring-coated with a solution prepared by dispersing 15.7 vol % of $Fe_3O_4$ (KN-320, Toda Kogyo Corporation) in PAI (VYROMAX HR-16NN, manufactured by Toyobo Co., Ltd.) relative to a solid content of the PAI solution.

The heat generating layer in the obtained fixing rotating member includes a porous portion, and a number average crystal grain size of silver in the heat generating layer was 180 nm and a porosity was 40 area %. A number average particle size of particles contained in a protective layer and having a function of preventing oxidation of the heat generating layer was 0.27 μm. A volume resistivity of the heat generating layer was $2.8\times10^{-8}$ Ω·m.

Comparative Example 1

A fixing rotating member was created in the same manner as in Example 1 except that particles having a function of preventing oxidation of the heat generating layer were not contained in the PAI solution that was applied onto the entire surface of the heat generating layer 20*b*. The heat generating layer includes a porous portion, and a volume resistivity of the heat generating layer was $2.8\times10^{-8}$ Ω·m.

Comparative Example 2

A fixing rotating member was created in the same manner as in Example 2 except that particles having a function of preventing oxidation of the heat generating layer were not contained in the PAI solution that was applied onto the entire surface of the heat generating layer 20*b*. The heat generating layer includes a porous portion, and a volume resistivity of the heat generating layer was $4.7\times10^{-8}$ Ω·m.

Comparative Example 3

A fixing rotating member was created in the same manner as in Example 3 except that particles having a function of preventing oxidation of the heat generating layer were not contained in the PAI solution that was applied onto the entire surface of the heat generating layer 20*b*. The heat generating layer includes a porous portion, and a volume resistivity of the heat generating layer was $5.7\times10^{-8}$ Ω·m.

Evaluation: High Temperature Test

The fixing rotating member obtained in Examples 1 to 9 and Comparative Examples 1 to 3 were cut into half as will be described below, and one half of each of the cut portions was stored under atmospheric pressure at 240° C. for 60 hours. This storage temperature was set from an overheating temperature assumed in the paper non-passing portion under a special use environment (in the case of continuous small-size printing) when the fixing rotating member was actually incorporated into a fixing unit and used.

Evaluation: Resistance Value Measurement

Resistance value evaluation was performed using contact resistance measurement. The created fixing rotating member was cut into half, one half was used for initial resistance evaluation, and the other was used for evaluation after a high-temperature test as described above. When measuring resistance, the resin layer portion was peeled off using a cutter, and measurement was performed by a four-terminal resistance measurement method. The resistance measurement will be described in detail below.

Resistance measurements were performed using a resistance meter 3541 manufactured by HIOKI E.E. Corporation, and two FPC-GS-500 probes manufactured by Form Factor, Inc. The mode of the resistance meter was set to a low power mode, and a resistance value was measured by pressing the probes against the heat generating layer so that a distance between the respective sense probes was 20 mm. The measured resistance value was converted into a volume resistivity using the width and film thickness of the heat generating layer. The width and film thickness of the heat generating layer were measured by a scanning electron microscope.

Similar measurements were performed before and after the high temperature test, and a fluctuation rate of a volume resistivity value from the initial value was evaluated with the initial value before the high temperature test.

Evaluation in which the fluctuation rate of the volume resistivity value exceeded 5% was set as Evaluation B, and evaluation in which the fluctuation rate of the volume resistivity value was 5% or less was set as Evaluation A.

TABLE 1

| | Base material containing resin | | | | Heat generating layer | Protective layer containing resin | | | | High temperature test Resistance evaluation | |
|---|---|---|---|---|---|---|---|---|---|---|---|
| | First Resin | | Particle having action of preventing oxidation | | | Second Resin | | Particle having action of preventing oxidation | | Resistance fluctuation | |
| | Type | Thickness µm | Type | Ratio Area % | Porosity % | Type | Thickness µm | Type | Ratio Area % | rate % | Determination |
| Example 1 | PI | 40 | — | — | 40 | PAI | 50 | Fe3O4 | 0.84 | 4.08 | A |
| Example 2 | PI | 40 | — | — | 25 | PAI | 50 | Fe3O4 | 0.84 | 3.21 | A |
| Example 3 | PI | 40 | — | — | 17 | PAI | 50 | Fe3O4 | 0.84 | 2.67 | A |
| Example 4 | PI | 40 | — | — | 40 | PAI | 50 | FeO | 0.71 | 3.63 | A |
| Example 5 | PI | 40 | — | — | 40 | PAI | 50 | Fe | 0.52 | 3.81 | A |
| Example 6 | PI | 40 | — | — | 40 | PI | 40 | Fe3O4 | 0.84 | 2.91 | A |
| Example 7 | PI | 40 | Fe3O4 | 0.80 | 40 | PAI | 50 | Fe3O4 | 0.84 | 3.06 | A |
| Example 8 | PI | 40 | CB | 9.89 | 40 | PAI | 50 | Fe3O4 | 0.84 | 3.63 | A |
| Example 9 | PI | 40 | — | — | 40 | PAI | 50 | Fe3O4 | 15.70 | 3.45 | A |
| Comparative Example 1 | PI | 40 | — | — | 40 | PAI | 50 | — | — | 6.66 | B |
| Comparative Example 2 | PI | 40 | — | — | 25 | PAI | 50 | — | — | 5.76 | B |
| Comparative Example 3 | PI | 40 | — | — | 17 | PAI | 50 | — | — | 5.19 | B |

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2024-070502 filed Apr. 24, 2024, which is hereby incorporated by reference herein its entirety.

What is claimed is:

1. A fixing rotating member comprising:

a base material comprising a first resin;

a heat generating layer comprising silver on the base material; and a protective layer comprising a second resin on a surface of the heat generating layer on a side opposite to a side facing the base material, wherein the heat generating layer extends in a circumferential direction of an outer peripheral surface of the base material, the heat generating layer comprises a porous portion, and at least one of the base material and the protective layer comprises a particle having a function of preventing oxidation of the heat generating layer.

2. The fixing rotating member according to claim 1, wherein the protective layer comprises at least one selected from the group consisting of polyimide and polyamide-imide.

3. The fixing rotating member according to claim 1, wherein the particle itself is oxidized to exhibit a function of preventing oxidation of the heat generating layer.

4. The fixing rotating member according to claim 1, wherein the particle comprises at least one element selected from a group comprising Group 3 to Group 16 elements on the International Union of Pure and Applied Chemistry (IUPAC) periodic table.

5. The fixing rotating member according to claim 1, wherein the particle comprises at least one element selected from the group consisting of Ni, Ti, Fe, Cu, and Zn elements.

6. The fixing rotating member according to claim 1, wherein the particle comprises at least one selected from the group consisting of Fe and FeO, which are simple substances, and $Fe_3O_4$.

7. The fixing rotating member according to claim 1, wherein a ratio of pores in a cross-section of the heat generating layer, which is measured by observing a cross-section of the heat generating layer sampled from the fixing rotating member in a thickness direction, is 15 to 50 area %.

8. The fixing rotating member according to claim 1, wherein a ratio of the particle to a total content of the resin and the particle in the layer comprising the particle is 0.1 to 20.0 area %.

9. A fixing device comprising:

a fixing rotating member; and an induction heating device that causes the fixing rotating member to generate heat by induction heating, wherein the fixing rotating member comprises:

a base material comprising a first resin;

a heat generating layer comprising silver on the base material; and a protective layer comprising a second resin on a surface of the heat generating layer on a side opposite to a side facing the base material, the heat generating layer extends in a circumferential direction of an outer peripheral surface of the base material, the heat generating layer comprises a porous portion, and at least one of the base material and the protective layer comprises a particle having a function of preventing oxidation of the heat generating layer.

10. An electrophotographic image forming apparatus comprising:

an image carrier that carries a toner image;

a transfer device that transfers the toner image to a recording material; and a fixing device that fixes the transferred toner image to the recording material, wherein the fixing device comprises a fixing rotating member; and an induction heating device that causes the fixing rotating member to generate heat by induction heating, the fixing rotating member comprises:

a base material comprising a first resin;

a heat generating layer comprising silver on the base material; and a protective layer comprising a second resin on a surface of the heat generating layer on a side opposite to a side facing the base material, the heat generating layer extends in a circumferential direction of an outer peripheral surface of the base material, the heat generating layer comprises a porous portion, and at least one of the base material and the protective layer comprises a particle having a function of preventing oxidation of the heat generating layer.

* * * * *